United States Patent
Sasaki

(10) Patent No.: US 7,055,408 B2
(45) Date of Patent: Jun. 6, 2006

(54) APPARATUS FOR TIGHTENING THREADED MEMBER

(75) Inventor: Shuiti Sasaki, Sayama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/525,656

(22) PCT Filed: Oct. 22, 2003

(86) PCT No.: PCT/JP03/13472

§ 371 (c)(1),
(2), (4) Date: Feb. 25, 2005

(87) PCT Pub. No.: WO2004/037480

PCT Pub. Date: May 6, 2004

(65) Prior Publication Data

US 2005/0247166 A1    Nov. 10, 2005

(30) Foreign Application Priority Data

Oct. 25, 2002    (JP)    .............................. 2002-311948

(51) Int. Cl.
*B25B 13/00* (2006.01)
(52) U.S. Cl. .............. 81/54; 81/55; 81/57.37; 81/433; 81/435; 81/57.38
(58) Field of Classification Search ............ 81/54, 81/56, 57.37, 433, 435, 57.38
See application file for complete search history.

(56) References Cited

U.S. PATENT DOCUMENTS

| 3,126,774 A | 3/1964 | Carr et al. |
| 3,969,810 A * | 7/1976 | Pagano .................... 29/407.02 |
| 5,123,309 A | 6/1992 | Moceri |
| 6,144,891 A * | 11/2000 | Murakami et al. .......... 700/108 |

FOREIGN PATENT DOCUMENTS

| EP | 0 348 282 A1 | 12/1989 |
| JP | 60-6320 A | 1/1985 |
| JP | 3-228524 A | 10/1991 |
| JP | 4-152033 A | 5/1992 |
| JP | 6-31644 A | 2/1994 |
| JP | 9-254044 A | 9/1997 |
| JP | 2000-61745 A | 2/2000 |
| JP | 2000-135636 A | 5/2000 |

* cited by examiner

*Primary Examiner*—Joseph J. Hail, III
*Assistant Examiner*—Shantese L. McDonald
(74) *Attorney, Agent, or Firm*—Standley Law Group LLP

(57) ABSTRACT

An apparatus (10) for tightening a hexagon head bolt (13) includes a vertically movable automatic robot arm (16), a screwing mechanism (18) having a rotational part (19), a shaft member (20) mounted to the rotational part, a socket portion (21) mounted to the shaft member for receiving therein a head (14) of the bolt, and a retention means (22) for retaining the head received in the socket portion or retaining the head released from the socket portion. When the arm moves vertically with the head received in the socket portion, the rotational part is rotated along with the shaft member and the socket portion to screw the bolt into a threaded aperture (12) of a crankcase (11) of an engine.

6 Claims, 22 Drawing Sheets

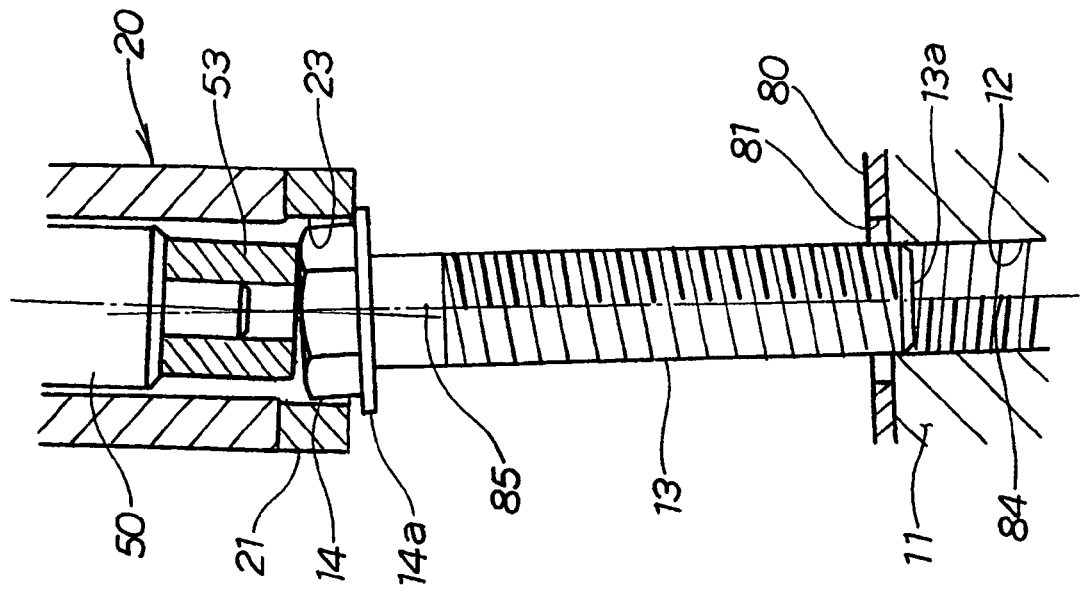
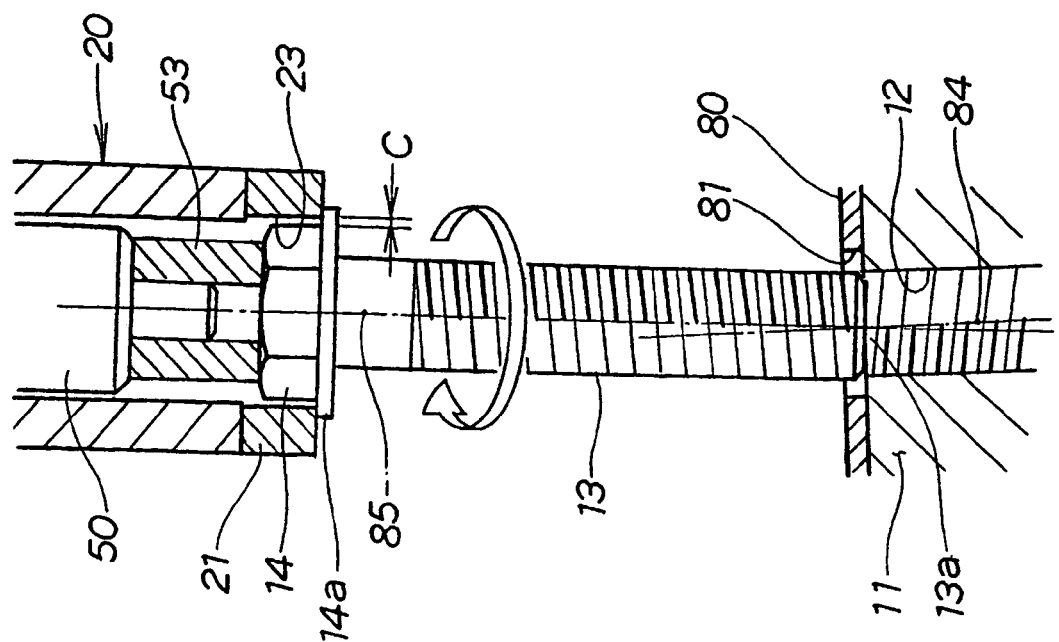

APPARATUS FOR TIGHTENING THREADED MEMBER

TECHNICAL FIELD

The present invention relates to an apparatus for tightening threaded members such as bolts or nuts for coupling components to workpieces.

BACKGROUND ART

Known bolt-tightening apparatus (so called "nut runner") for tightening bolts include electric motors and tightening members for tightening bolts. The tightening members have receiving portions for receiving heads of the bolts. With the heads of the bolts received within the receiving portions, the electric motors are driven to rotate the tightening members, so as to tighten the bolts.

One example of such apparatuses is shown in, for example, Japanese Patent Laid-Open Publication No. HEI 6-31644.

The apparatus as disclosed in the publication includes an electric nut runner and a bolt-feeding device for feeding bolts to the nut runner. The nut runner is driven by an electric motor to tighten the bolt.

FIG. 23 hereof shows an exemplary conventional method of screwing bolts 202 for attachment of an oil pan (sump) 201 to a crankcase 200 of an engine.

With the crankcase 200 turned upside down, the oil pan 201 is placed onto a bottom surface 203 of the crankcase 200 to bring apertures 205, 205 formed through the oil pan 201 into alignment with screw-threaded apertures (not shown) formed on the crankcase 200.

In this state, an operator inserts distal ends 202b, 202b of the bolts 202 into the apertures 205, 205, holding heads 202a, 202a of the bolts 202, 202 by hands 206, 206.

Then, the operator manually turns the bolts 202, 202 to screw the ends 202b, 202b into the screw-threaded apertures of the crankcase 11 by a distance of one to three times the pitch of the bolt 202. The operation of screwing the distal end 202b of the bolt 202 into the screw-threaded aperture by the distance of the one to three times the pitch will be termed "temporary tightening operation".

Likewise, the remaining bolts 202 undergo the temporary tightening operations to screw their distal ends into the corresponding apertures of the crankcase.

After subjected to the temporary tightening operation, the respective bolts are screwed into the screw-threaded aperture through the use of such motive tool as a nut runner or the like until these bolts are tightened throughout the lengths thereof within the apertures of the crankcase.

The operation for screwing the bolt into the screw-threaded aperture by a distance equal to the overall length of the bolt to tighten the bolt within the screw-threaded aperture will be termed "final tightening operation".

For the aforementioned method, however, the operator manually performs the temporary tightening operation with tiresomeness and troublesomeness. Moreover, the final tightening operation subsequent to such problematic temporary tightening operation requires certain time and burden. The method involving these two operations are less suitable for improving productivity of the engine.

DISCLOSURE OF THE INVENTION

An object of the present invention is to provide an apparatus for tightening threaded members by performing the reduced number of steps to effect, particularly, the temporary tightening operation. In handling the apparatus, particularly, to perform the temporary tightening operation, an operator can bear a reduced burden.

According to a first aspect of the present invention, there is provided an apparatus for tightening a threaded member, comprising: a screwing mechanism including a rotational shaft and a threaded engagement member threadedly engaging an outer periphery of the rotational shaft; an axial movement means provided to one of the rotational shaft and the threaded engagement member for axially moving to rotate the rotational shaft; a shaft member provided to the rotational shaft and capable of rotating in unison with the rotational shaft; a socket portion provided to one end of the shaft member for receiving therein the threaded member in such a manner as to transmit the rotation of the shaft member to the threaded member; and a retention means for retaining the threaded member received in the socket portion or the threaded member released from the socket portion.

The axial movement means moves axially to rotate the threaded member. By thus undergoing the rotational movement, the threaded member can be subjected to tightening operation. Thus, the tightening operation, particularly, temporary tightening operation on the threaded member can be mechanically effected. In addition to the temporary tightening operation, the apparatus can be used to perform final tightening operation.

The use of this apparatus is advantageous because the tightening operation on the threaded member can be accomplished through a reduced number of steps, imposing little burden upon an operator.

Preferably, the shaft member is hollowed to define a space, and the retention means comprises a rod axially movably disposed within the space of the shaft member and having a lower end positioned in the vicinity of the socket portion, a magnet provided to the lower end of the rod for magnetically holding a head of the threaded member to retain the threaded member received in the socket portion, and a moving means for moving the rod in such a manner as to move the magnet away from the socket portion to retain the threaded member released from the socket portion.

The shaft member has the axially movable rod accommodated there within. The rod includes at its lower end the magnet for magnetically holding the threaded member. Because the magnet magnetically holds the threaded member, the threaded member can be held received within the socket portion.

The moving means moves the rod away from the socket portion to thereby bring the magnet into spaced relation to the socket portion. With the magnet thus spaced from the threaded member, the threaded member can remain tightened without undergoing attracting force of the magnet.

Preferably, the shaft member is pivotally connected to the rotational shaft.

Generally speaking, threaded apertures of workpieces have their dimensions including tolerances. Some threaded member can be less precisely set in the threaded apertures due to such tolerances. To address this problem, the shaft member is pivotable on the rotational shaft.

The shaft member can be pivoted to such a position as to smoothly bring the threaded member received within the socket portion into threaded engagement with the threaded aperture.

Preferably, the axial movement means is an automatic robot arm axially movable to rotate the rotational shaft.

The automatic robot arm can be programmed to move axially by a distance set taking into account an extent to which the threaded member is tightened.

According to a second aspect of the present invention, there is provided an apparatus for tightening a threaded member to a workpiece, the apparatus shuttling between the workpiece and a supplying section at which the apparatus is supplied with the threaded member, the apparatus comprising: an automatic robot arm; a screwing mechanism provided to the automatic robot arm and including a rotational part and a threaded engagement member threadedly engaging the rotational part; an axial movement means for axially moving to move the threaded engagement member axially of the rotational part to rotate the rotational part; a shaft member axially movably provided to the rotational part via a slide part slidable relative to the rotational part, the shaft member capable of rotating in unison with the rotational part; an urging means for urging the shaft member in a direction away from the rotational part; a socket portion provided to one end of the shaft member for receiving therein the threaded member in such a manner as to transmit the rotation of the shaft member to the threaded member; and a retention means for retaining the threaded member received in the socket portion or retaining the threaded member released from the socket portion.

Receiving therein the threaded member, the socket portion is moved to set the threaded member in position into or onto a companion threaded part of a workpiece. The automatic robot arm is then operated to push the screwing mechanism towards the workpiece. This causes the urging means to force the slide part and the shaft member towards the workpiece. Consequently, the threaded member is pressed into or onto the companion threaded part of the workpiece.

The means then moves axially to move the threaded engagement member of the screwing mechanism. The movement of the member rotates the rotational part. The rotation of the rotational part is transmitted to the slide part, the shaft member and the socket portion. The rotating force with which the socket portion is rotated is applied to the threaded member.

By undergoing concurrently both the rotating force and the pressing force, the threaded member is screwed into or onto the companion threaded member.

Preferably, the axial movement means moves axially to rotate the rotational part in either one direction to tighten the threaded member to the workpiece or the opposite direction to loosen the threaded member out of the workpiece.

The rotational part can be rotated in either of two directions. When rotating in the one direction, the threaded member is tightened. When rotating in the other, the threaded member is loosened. The use of the apparatus is advantageous in that the threaded member does not seize up in or on the companion threaded member and hence the threaded member can be smoothly loosened out of the companion threaded member.

BRIEF DESCRIPTION OF DRAWINGS

Certain preferred embodiments of the present invention will hereinafter be described in detail, by way of example only, with reference to the accompanying drawings, in which:

FIG. 13A shows the shaft member turned with the bolt held to the magnet and FIG. 13B shows the bolt vertically aligned with the aperture and screwed into the aperture by a distance of one to triple pitches;

BEST MODE FOR CARRYING OUT THE INVENTION

Figure 1:
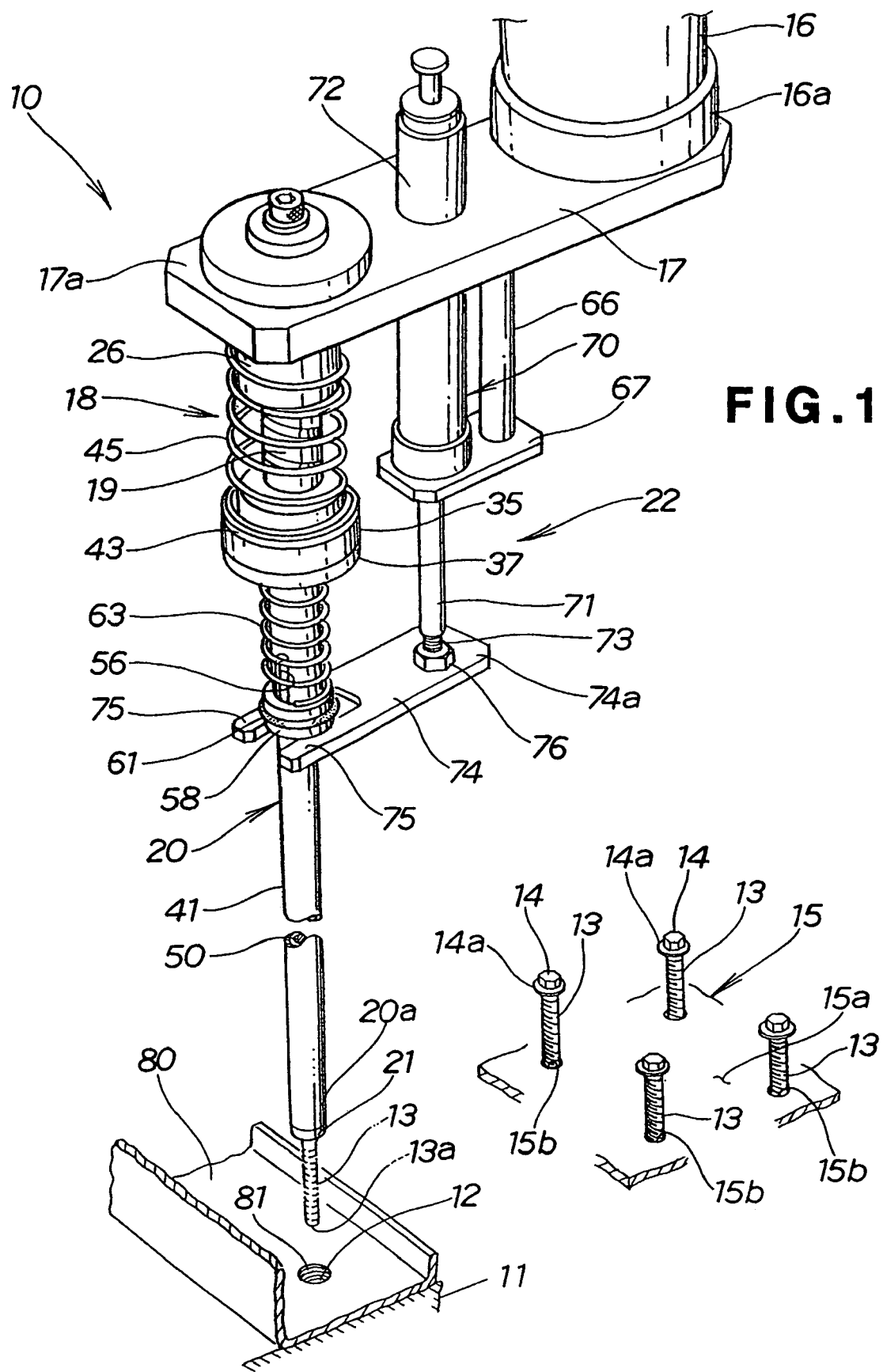
FIG. 1 is a perspective view of an apparatus for tightening a threaded member in accordance with a first embodiment of the present invention.
Figure 2:
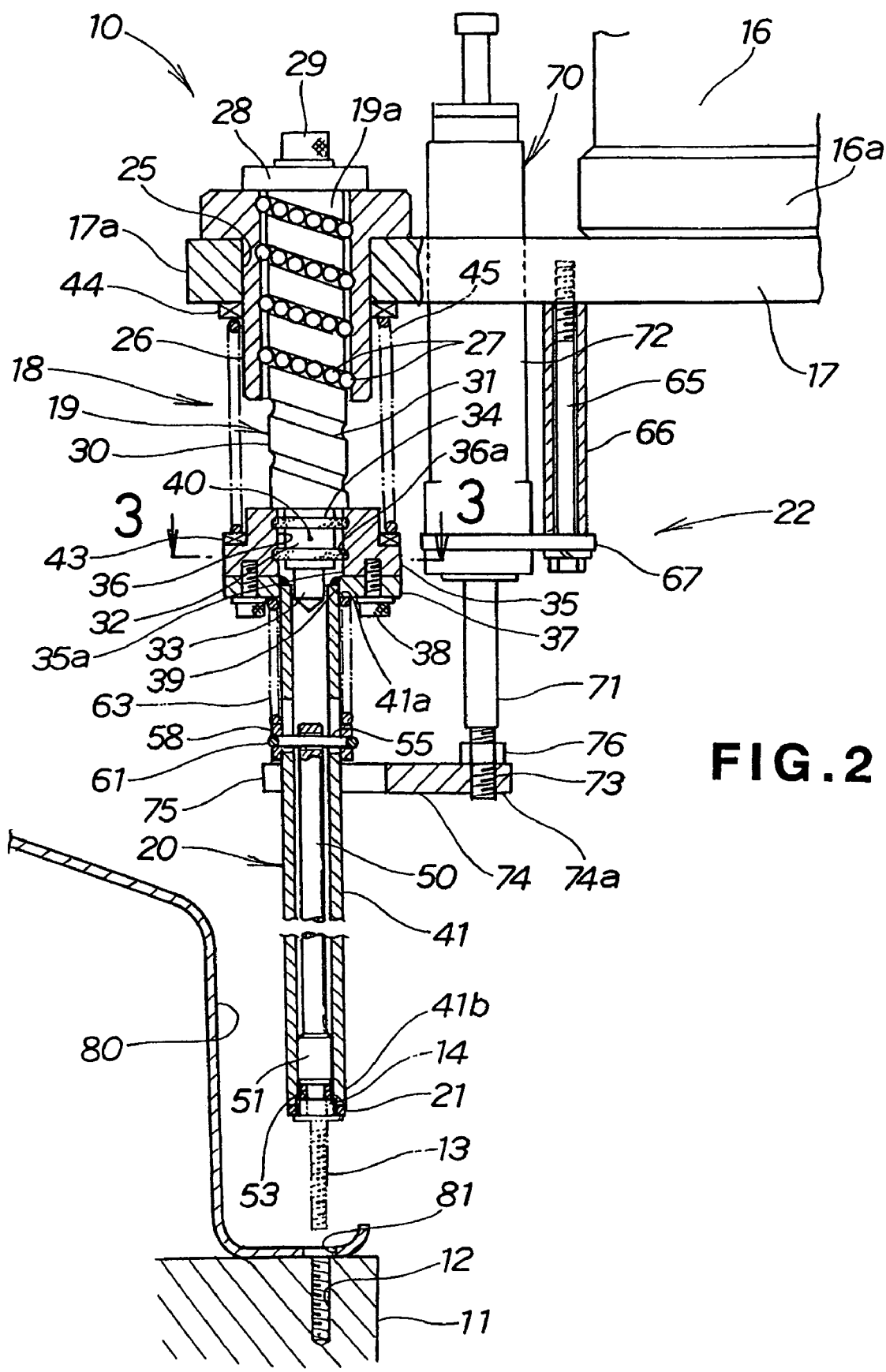
FIG. 2 shows partly in vertical cross-section the apparatus of FIG. 1.

Reference will now be made in detail to exemplary embodiments of the present invention which are illustrated in the accompanying drawings. The same reference numerals will be used throughout the drawings to refer to the same or like parts.

Referring to FIG. 1, there is shown an apparatus 10 for tightening a threaded member according to a first embodiment of the present invention. In the illustrated embodiment, the threaded member is a hexagon head bolt 13. The apparatus 10 includes a screwing mechanism 18 having a rotational shaft 19, and an automatic robot arm 16 (axially moving means for moving axially to rotate the rotational shaft 19). The screwing mechanism 18 is mounted via a bracket 17 to a lower end 16a of the arm 16. The apparatus 10 further includes a shaft member 20 pivotably connected to a lower end of the rotational shaft 19 of the screwing mechanism 18. The robot arm 16 is arranged to move axially of the rotational shaft 19 so as to rotate the shaft 19. That is, the axial movement of the arm 16 is converted to rotation of the rotational shaft 19. The shaft member 20 has a socket portion 21 provided at a distal end thereof. The socket portion 21 is designed or sized to receive a head 14 of the bolt 13 therein. As will be described later, when the rotational shaft 19 is rotated, the shaft member 20 can be rotated together with the head 14 of the bolt 13 received within the socket portion 21. That is, the rotation of the shaft member 20 can be transmitted to the bolt 13 having its head 14 received in the socket portion 21. The apparatus 10 further includes a retention means 22 for retaining the head 14 received within the socket portion 21 or retaining the head 14 released from the socket portion 21, as will be discussed later.

The automatic robot arm 16 is not only movable up and down, but it can also shuttle between a bolt-supplying section 15 and a temporary tightening position where the bolt 13 can be set in position in a screw-threaded aperture 12 of a crankcase 11 (workpiece) in preparation for temporary tightening operation, as will be described later. When the bolt 13 is subjected to "temporary tightening operation", it means that the bolt 13 is turned or screwed into the aperture 12 by a distance of one to three times the pitch of the bolt, as described hereinbefore.

The section 15 includes its upper surface 15a having plural bolt-receiving holes 15b formed therethrough. When inserted into the hole 15b, as shown in FIG. 1, the bolt 13 has its upper half projecting upwardly out of the upper surface 15a.

The automatic robot arm 16 has its distal end 16a mounted to the bracket 17 of generally rectangular configuration. The bracket 17 includes its distal end 17a having a mounting aperture 25 formed therethrough. The mounting aperture 25 has a threaded engagement member 26 fitted thereinto. The rotational shaft 19 is rotatably provided via balls 27 to the inside of the member 26. The rotational shaft 19 includes its upper end 19a having a flange 28 mounted thereto by means of a bolt 29. The thus arranged flange 28 retains the rotational shaft 19 extending through the threaded engagement member 26. The rotational shaft 19, the balls 27 and the threaded engagement member 26 constitute the screwing mechanism 18 serving as a ball screw mechanism.

The rotational shaft 19 has its body 30 having a helically extending guide groove 31 formed thereon. The guide groove 31 is provided for guiding the balls 27 therealong. The body 30 has a first insertion portion 32 of generally rectangular cross-section provided at a lower end thereof. The first insertion portion 32 has a second insertion portion 33 of generally circular cross-section provided at a lower end thereof.

Fitted round the first insertion portion 32 are upper and lower O rings 34, 34 vertically spaced from each other by a given interval. By means of such O rings 34, 34, the first insertion portion 32 is connected to the shaft member 20.

More specifically, the shaft member 20 includes a connection portion 35. The connection portion 35 has its inner peripheral wall 35a defining a hole 36 vertically extending through the connection portion 35. The inner peripheral wall 35a also has upper and lower annular grooves 36a, 36a formed thereon in vertically spaced relation to each other. The annular grooves 36a, 36a are provided for locking therein the upper and lower O rings 34, 34, respectively. Each annular groove 36a extends horizontally and communicates with the hole 36. The connection portion 35 is connected to the rotational shaft 19 and has its lower end mounted via bolts 38, 38 to a flange 37. The flange 37 has a mounting aperture 39 formed to vertically extend therethrough. Mounted within the aperture 39 is a proximal end (an upper end) 41a of a shaft body 41 of the shaft member 20.

The first insertion portion 32 remains out of contact with the inner peripheral wall 35a. Compressing the upper and lower O rings 34, 34 allows the connection portion 35 to be inclined relative to the first insertion portion 32.

The inclining of the connection portion 35 relative to the first insertion portion 32 allows the shaft member 20 to pivot in any desired direction on a center 40 of the first insertion portion 32.

Figure 4:
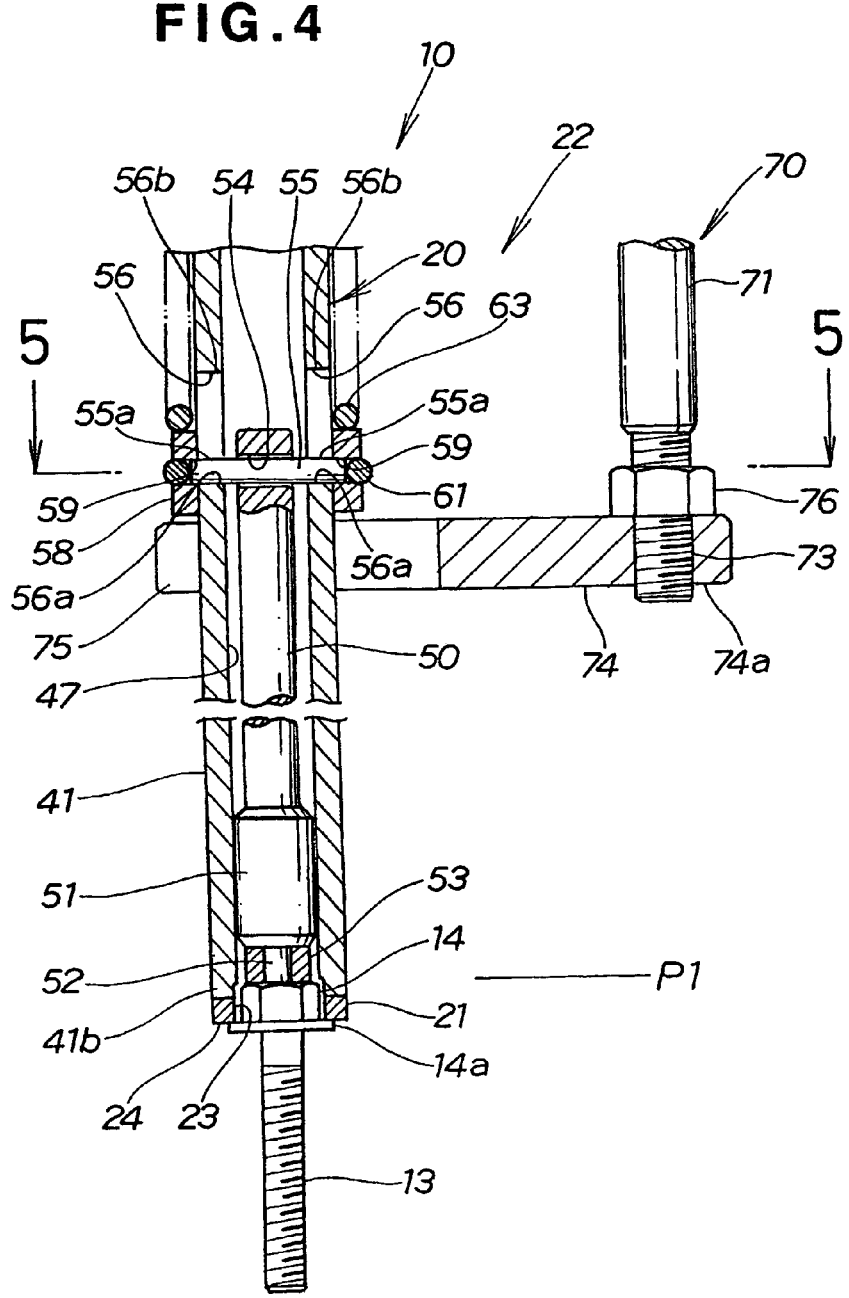
FIG. 4 shows partly in cross-section a retention means of the apparatus.

The shaft body 41 of the shaft member 20 is hollowed to define a vertically elongated space 47 (See FIG. 4). The shaft body 41 of the shaft member 20 has a socket portion 21 provided at a distal end 41b thereof. It is to be understood that the distal end 41b is a lower end of the shaft member 20. The socket portion 21 will be discussed in detail with reference to FIG. 4.

The connection portion 35 includes a step portion having a lower thrust bearing 43 positioned thereon. The threaded engagement member 26 has an upper thrust bearing 44 fitted therearound. The upper thrust bearing 44 abuts against a lower surface of the bracket 17. The upper and lower thrust bearings have a first compression spring 45 disposed therebetween.

Figure 3:
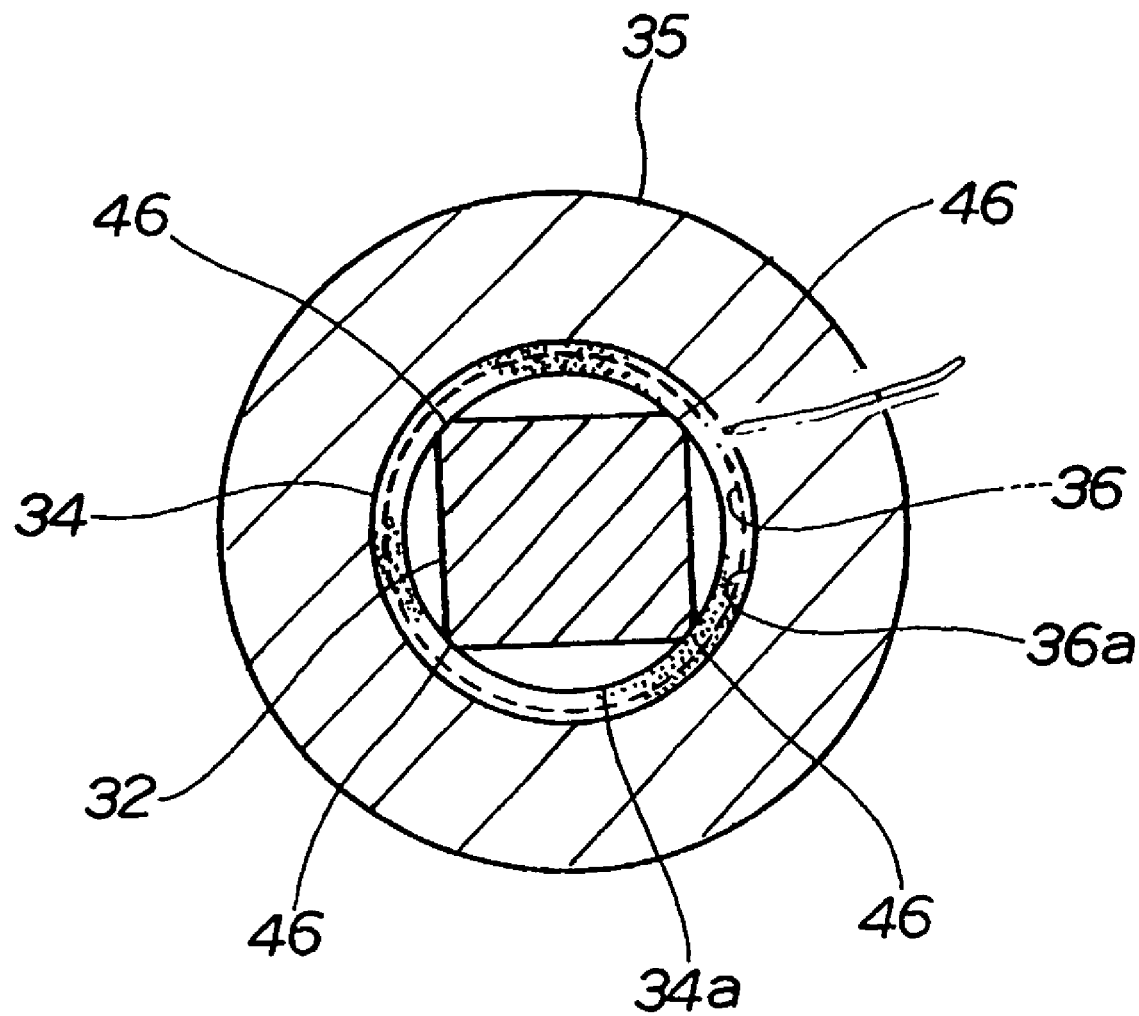
FIG. 3 is a cross-sectional view taken along line 3—3 of FIG. 2.

Reference is made to FIG. 3. The first insertion portion 32 of generally rectangular cross-section has its four chamfered corners 46. The upper and lower O rings 34, 34 (only the lower one of which is shown) are locked in the annular grooves 36a, 36a (only the lower one of which is shown) with their inner surfaces 34a abutting on the four chamfered corners 46 of the first insertion portion 32. The upper and lower O rings 34, 34 are vertically spaced from each other by the given interval. The first insertion portion 32 is connected to the connection portion 35 through the O rings 34, 34.

With this arrangement, the first insertion portion 32 thus arranged is in no contact with the inner peripheral wall 35a.

Compression of the upper and lower O rings 34, 34 permits the connection portion 35 to be inclined relative to the first insertion portion 32.

As shown in FIG. 4, the retention means 22 includes a rod 50 axially movably disposed within the space 47 of the shaft body 41. The rod 50 has its lower end 51 positioned in the vicinity of the socket portion 21. The lower end 51 of the rod 50 is of enlarged diameter. The enlarged diameter portion 51 has a projection protruding downwardly from the center of a lower end thereof. The projection 52 is fitted within an annular magnet 53. The magnet 53 is provided to the lower end of the enlarged diameter portion 51.

The rod 50 includes its upper end having an aperture 54 formed to extend laterally therethrough. The aperture 54 has a pin 55 inserted therethrough. The shaft body 41 has aperture-defining lower ends 56a, 56a and aperture-defining upper ends 56b, 56b cooperating with each other to define vertically elongated apertures 56, 56 formed to laterally extend through the shaft body 41. Around the shaft body 41, there is provided a ring 58 having apertures 59, 59 formed to extend laterally therethrough. The pin 55 has its opposite ends 55a, 55a projecting out of the aperture 54 through the apertures 56, 56 into the apertures 59, 59. The apertures 59, 59 communicate with an annular groove 60 (see FIG. 5) formed to extend around on an outer peripheral surface of the ring 58. The groove 60 has an O ring 61 fitted therein. The O ring 61 has its inner periphery contacting opposite edges 55b, 55b of the pin 55. This arrangement prevents the pin 55 from coming out of the apertures 59, 59.

The ring 58 and the flange 37 have a second compression spring 63 disposed therebetween. The ring 58 is depressed by the second compression spring 63 to bring the pin 55 into abutment on the lower ends 56a, 56a. This abutment of the pin 55 on the lower ends 56a, 56a enables the magnet 53 to be held in an attracting position P1 where the head 14 of the hexagon head bolt 13 can be magnetically held to the magnet 53.

The retention means 22 includes a mounting plate 67 mounted via a bolt 65 and a collar 66 to the bracket 17 of the robot arm 16. The plate 67 and the bracket 17 have a cylinder unit 70 mounted thereto. The cylinder unit 70 includes a cylinder 72 and a rod 71 extending downwardly from a lower end of the cylinder 72. The rod 71 has a threaded portion 73 positioned at a lower end thereof. The threaded portion 73 is shown as being screwed into an aperture formed in a right end 74a of a yoke 74. The threaded portion 73 threadedly engages a lock nut 76. The lock nut 76 is tightened onto the yoke 74 to lock the yoke 74. The yoke 74 has a pair of claws 75, 75 sandwiching the shaft body 41 (see FIG. 1 and FIG. 5) therebetween. As will be explained below, the cylinder unit 70 acts as a moving means for moving the rod 71 to move the magnet 53 away from the socket portion 21.

The cylinder unit 70 is operable to retract the rod 71, whereby the yoke 74 is raised to press the claws 75, 75 against a lower surface of the ring 58. With the claws 75, 75 pressed against the lower surface of the ring 58, the yoke 74 can be further raised to thereby lift the ring 58 upwardly against a force produced by the second compression spring 63, such that the pin 55 can be lifted up along the apertures 56, 56 together with the ring 58.

This upward movement of the pin 55 causes the rod 50 to move upwardly together with the magnet 53. As a result, the magnet 53 reaches a releasing position P2 where the head 14 of the bolt 13 is released from the magnet 53 (see FIG. 9 and FIG. 10).

The socket portion 21 attached to the lower end 41b of the shaft body 41 is of generally annular configuration but has an inner periphery 23 of hexagonal configuration.

When the head 14 of the hexagon head bolt 13 is received within the socket portion 21, the head 14 has its flange 14a abutted against a lower surface 24 of the socket portion 21.

With the head 14 received within the socket portion 21, the magnet 53, when in the attracting position P1, attracts the bolt 13 to thereby magnetically hold the head 14 thereto. The retention means 22 can thus retain the head 14 of the bolt 13 received within the socket portion 21.

With the head 14 of the bolt 13 received within the socket portion 21 and held to the magnet 53, the shaft body 41 can be rotated to rotate the hexagon head bolt 13 as well as the socket portion 21.

Figure 5:
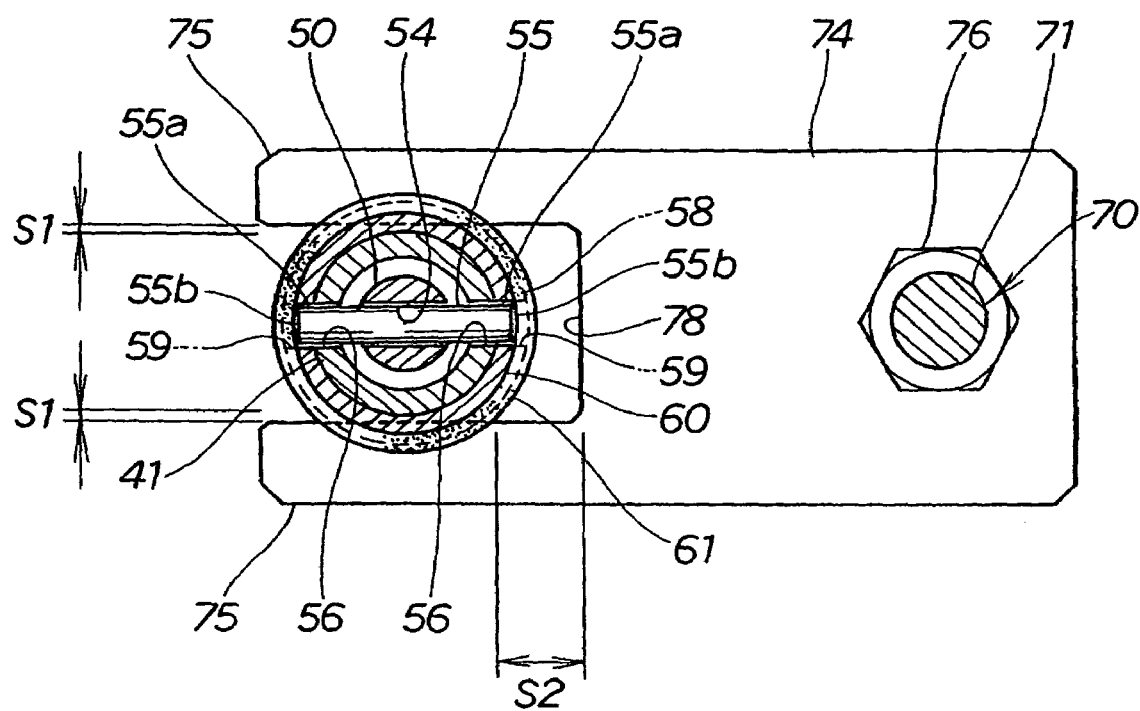
FIG. 5 is a cross-sectional view taken along line 5—5 of FIG. 4.

Turning now to FIG. 5, the pin 55 extends through the aperture 54 formed in the upper end of the rod 50. The pin 55 has its opposite ends 55a, 55a projecting from within the aperture 54 through the elongated apertures 56, 56 into the apertures 59, 59. The O ring 61 is fitted within the annular groove 60 communicating with the apertures 59, 59.

The O ring 61 has its inner periphery held in contact with the opposite edges 55b, 55b of the pin 55. This becomes possible to prevent the pin 55 from coming out of the apertures 59, 59.

The yoke 74 is secured to the rod 71 of the cylinder unit 70. The pair of claws 75, 75 of the yoke 74 sandwiches the shaft body 41. The yoke 74 faces the lower surface of the ring 58. In other words, the yoke 74 is positioned at a lower level than the ring 58.

The yoke 74 can be moved up using the cylinder unit 70 to thereby lift upwardly the rod 50 as well as the ring 58.

The one of the claws 75 is spaced from the shaft body 41 by a distance S1. So is the other claw 75. The yoke 74 has a recess wall 78 positioned between the claws 75, 75. The recess wall 78 is spaced from the shaft body 41 by a distance S2.

Spacing the claws 75, 75 and the recess wall 78 from the shaft body 41 makes it possible to prevent the shaft body 41 of the shaft member 20 from interfering with the claws 75, 75 and the recess wall 78 during the pivotal movement of the shaft member 20 on the center 40.

Now, discussion will be made as to how the temporary tightening operation is performed using the apparatus 10 in accordance with the first embodiment of the present invention.

Figure 6:
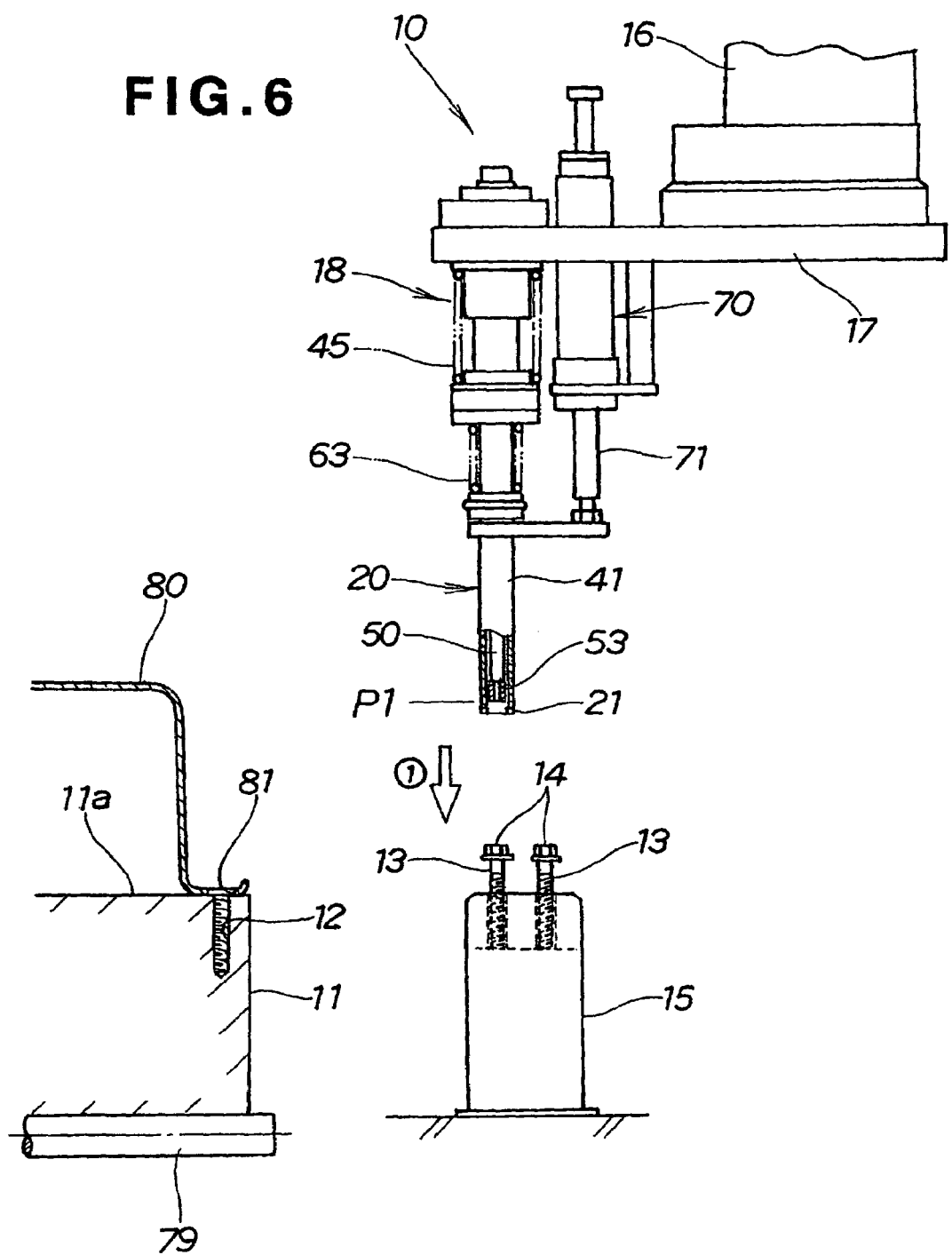
FIG. 6 shows the apparatus having a socket portion and a magnet of the retention means positioned above a hexagon head bolt.

Referring to FIG. 6, a crankcase 11 turned upside down is placed onto rollers 79 for conveyance. An oil pan (sump) 80 is then placed over a bottom surface 11a of the crankcase 11. The crankcase 11 and the oil pan 80 carried on the rollers 79 are conveyed into position below the temporary tightening position as explained in relation to FIG. 1.

The automatic robot arm 16 is operated to position the socket portion 21 above the hexagon head bolt 13 of the bolt-supplying section 15. Thereafter, the apparatus 10 is lowered as shown by an arrow ①.

Figure 7A:
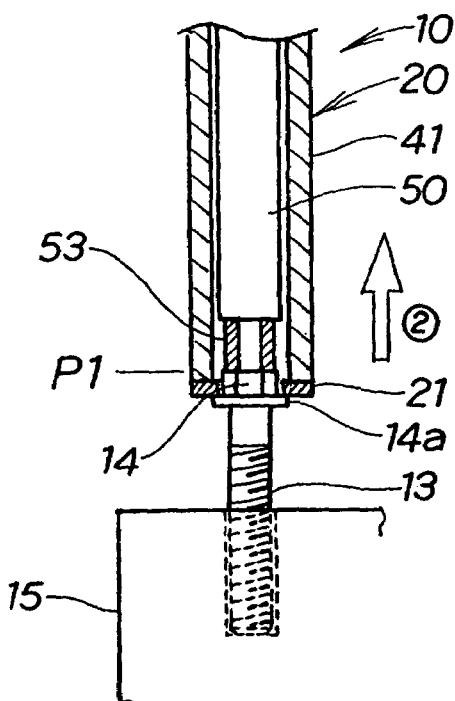
FIG. 7A shows the magnet holding the bolt within the socket portion.

As shown in FIG. 7A, the head 14 of the bolt 13 is received within the socket portion 21. At this time, the head 14 is magnetically held to the magnet 53 because the magnet 53 is held in the attracting position P1.

The apparatus 10 then moves upwardly to thereby move upwardly the shaft body 41 of the shaft member 20 as well as the socket portion 21 with the head 14 held to the magnet 53 within the socket portion 21, as shown by an arrow ②.

Because the bolt 13 is magnetically held to the magnet 53, the bolt 13 is lifted up together with the head 14 received within the socket portion 21, as shown by the arrow ②. The bolt 13 is therefore pulled out of the bolt-supplying section 15.

Figure 7B:
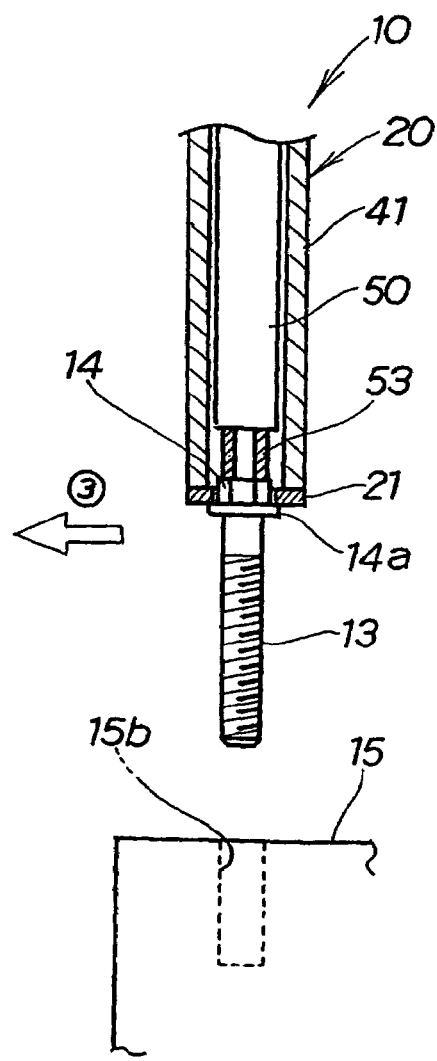
FIG. 7B shows the socket portion lifted with the bolt held to the magnet and FIG. 7C shows the socket portion lowered with the bolt set in place in a threaded aperture of a crankcase.

As shown in FIG. 7B, after the bolt 13 is pulled out of the section 15, the apparatus 10 horizontally leftward moves to horizontally move the socket portion 21 as well as the bolt 13, as shown by an arrow ③.

Figure 7C:
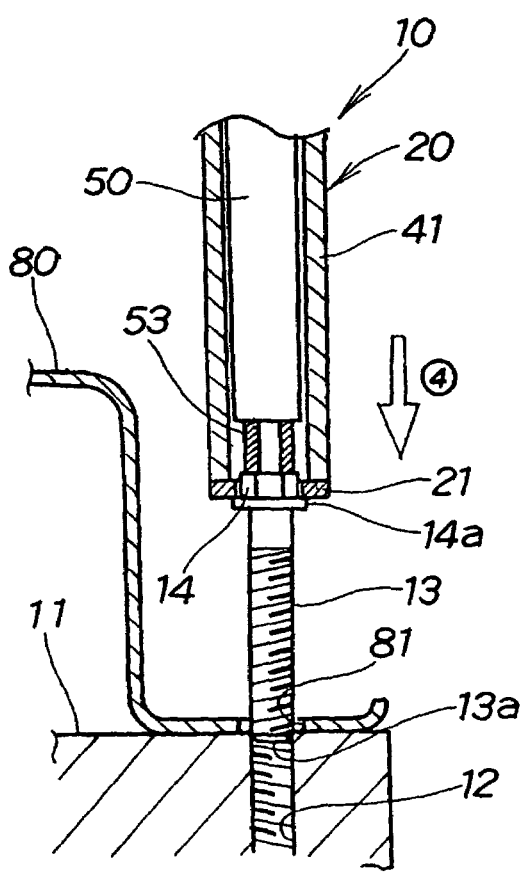

As Shown in FIG. 7C, by moving horizontally in the manner as stated with reference to FIG. 7B, the apparatus 10 reaches a position over the screw-threaded aperture 12 of the crankcase 11. The apparatus 10 is then lowered as shown by an arrow ④, thereby inserting a lower end 13a of the bolt 13 through a mounting aperture 81 formed in the oil pan 80 into the screw-threaded aperture 12. The lower end 13a of the bolt 13 is thus set in place in the aperture 12 for subsequent temporary tightening operation.

Figure 8:
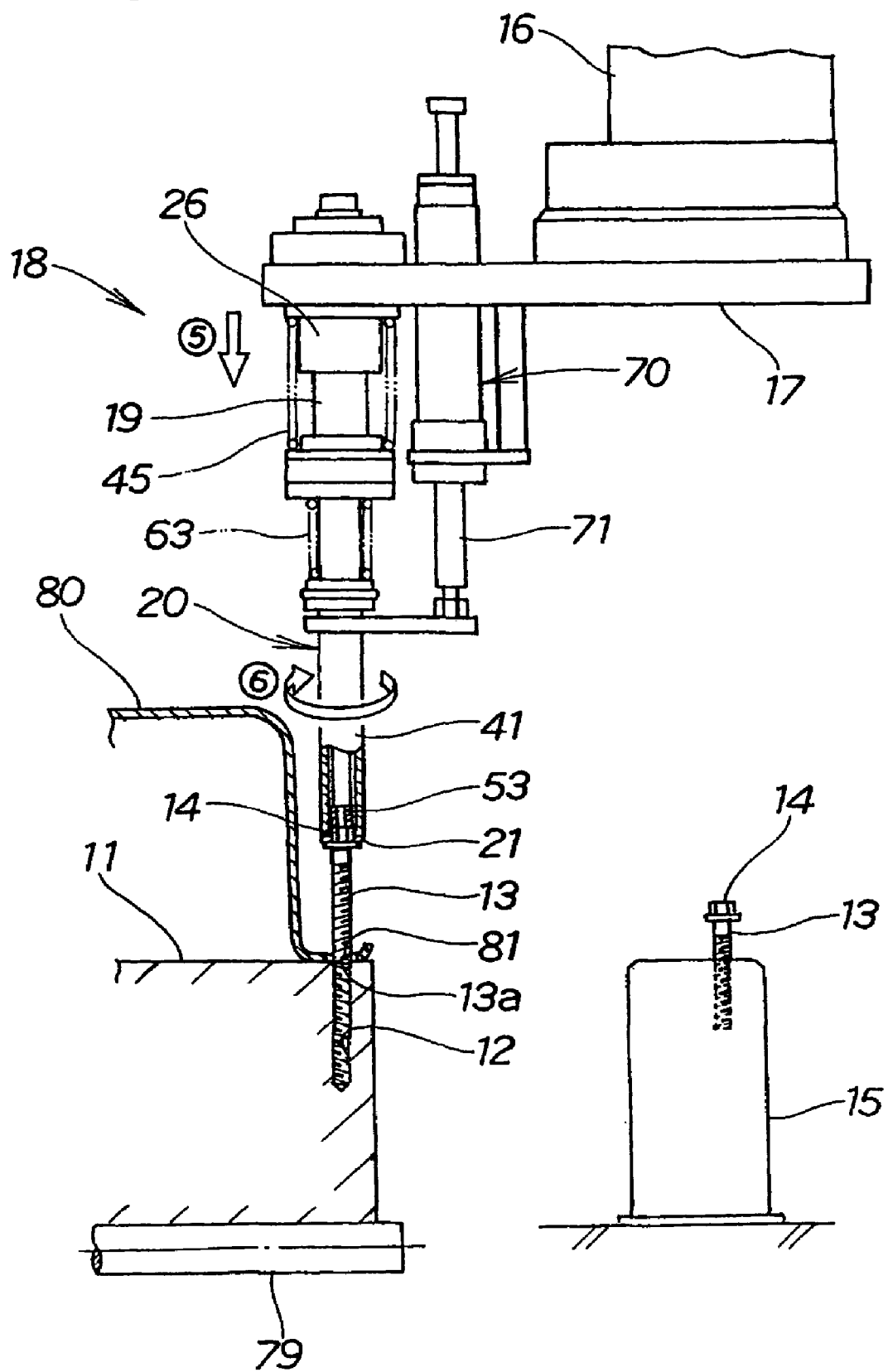
FIG. 8 shows the socket portion turned to screw the bolt into the aperture by a distance of single to triple pitches of the bolt.

Turning to FIG. 8, the robot arm 16 moves down to lower the threaded engagement member 26 along the axis or length of the rotational shaft 19, as shown by an arrow ⑤. The downward movement of the member 26 rotates the rotational shaft 19 clockwise to thereby rotate the shaft member 20 clockwise as shown by an arrow ⑥.

This causes the hexagon head bolt 13 to rotate clockwise together with the socket portion 21 of the shaft member 20, as shown by the arrow ⑥. More specifically, the bolt 13 is rotated to thereby screw the lower end 13a into the aperture 12 by a distance of one to three times the pitch of the bolt. The temporary tightening operation on the bolt 13 is thus completed.

Figure 9:
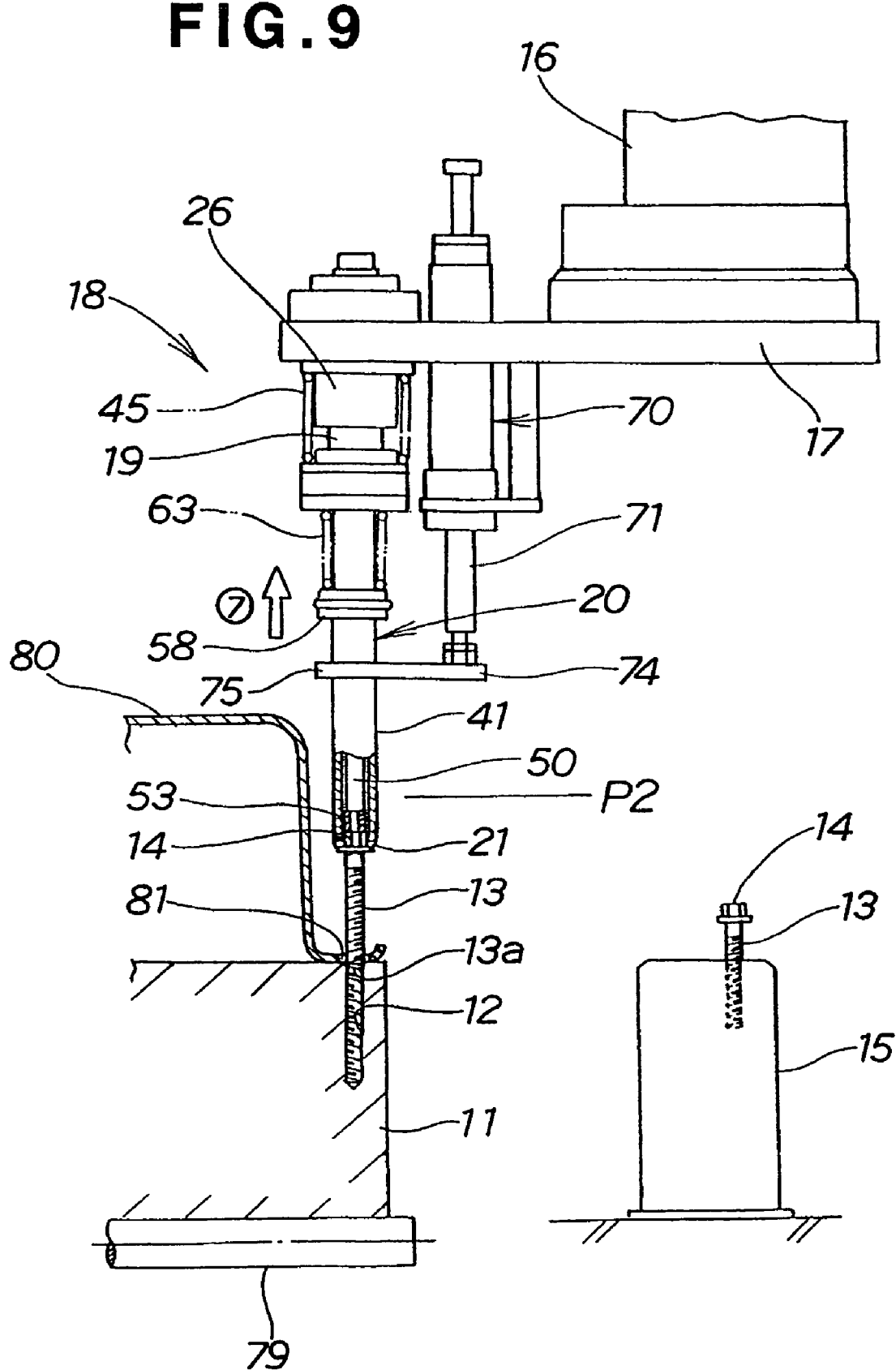
FIG. 9 is the view of FIG. 8 with the magnet raised to release the bolt.

Reference is made to FIG. 9. After the temporary tightening operation is finished, the cylinder unit 70 is operated to retract the rod 71. The retraction of the rod 71 moves the yoke 74 upwardly, as shown by an arrow ⑦, to bring the pair of claws 75, 75 into abutment against the ring 58.

The cylinder unit 70 continues to be operated to move the yoke 74 further upwardly. This further upward movement of the yoke 74 lifts the rod 50 as well as the ring 58. This causes the magnet 53 to move upwardly to the releasing position P2.

Because the magnet 53 is in the releasing position P2, the magnet 53 is positioned away from the socket portion 21 to bring the head 14 out of influence of the attracting force of the magnet 53. This makes it possible to release the bolt 13 from the magnet 53.

Figure 10:
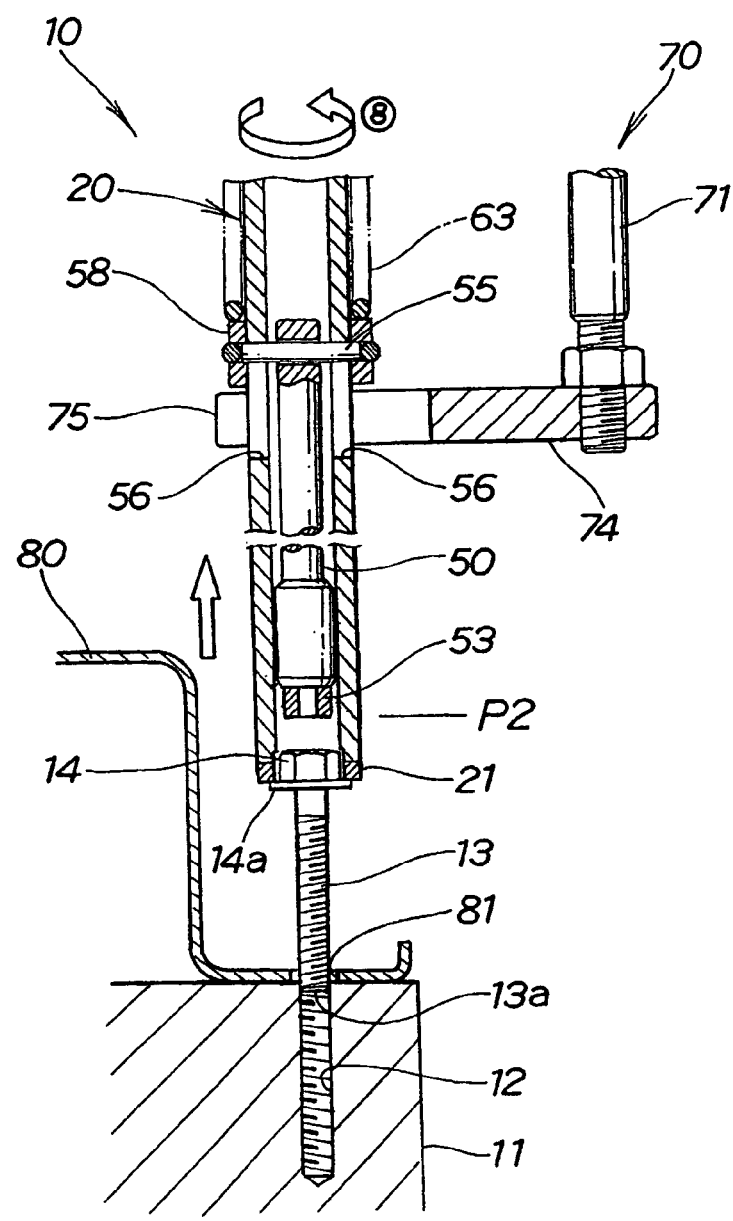
FIG. 10 shows the socket portion lifted leaving the bolt screwed into the aperture.

Reference is made to FIG. 10. With the magnet 53 in the releasing position P2, the automatic robot arm 16 is lifted up to thereby move the apparatus 10 upwardly. This causes the shaft member 20 to move upwardly as shown by an arrow.

During the upward movement of the robot arm 16, the threaded engagement member 26 having gone down as described in relation to FIG. 8 is lifted up along the axis or length of the rotational shaft 19 to thereby rotate the rotational shaft 19 and the shaft member 20 counterclockwise as shown by an arrow ⑧.

As discussed above, the magnet 53 is moved up to the releasing position P2 to thereby release the head 14 of the bolt 13 therefrom, after which the shaft member 20 is moved upwardly. This release of the head 14 of the bolt 13 from the magnet 53 helps the socket portion 21 move away from the head 14 of the bolt 13 as soon as the shaft member 20 is moved upwardly.

It thus becomes possible to move the socket portion 21 away from the bolt 13 by rotating the bolt 13 counterclockwise through only few degrees.

In other words, the socket portion 21 is raised while the hexagon head bolt 13 having undergone the temporary tightening operation has the lower end 13a left inserted into the screw-threaded aperture 12.

Therefore, the bolt 13 having undergone the temporary tightening operation remains screwed into the aperture 12 of the crankcase 11 by the distance of the one to triple pitches.

From the foregoing, the movement of the automatic robot arm 16 makes it possible to perform the temporary tightening operation on the hexagon head bolt 13. Namely, the temporary tightening operation can be carried out mechanically without requiring an operator's manual labor.

Further, the temporary tightening operation can be automated without relying on human operator's manual labor. Such automatic temporary tightening operation can be performed steadily and efficiently for a long time.

Further, the automatic robot arm 16 may be programmed for moving by an amount controlled taking account of an extent to which the bolt 13 is tightened into the aperture 12. The thus programmed arm 16 can provide its improved performance.

Figure 11:
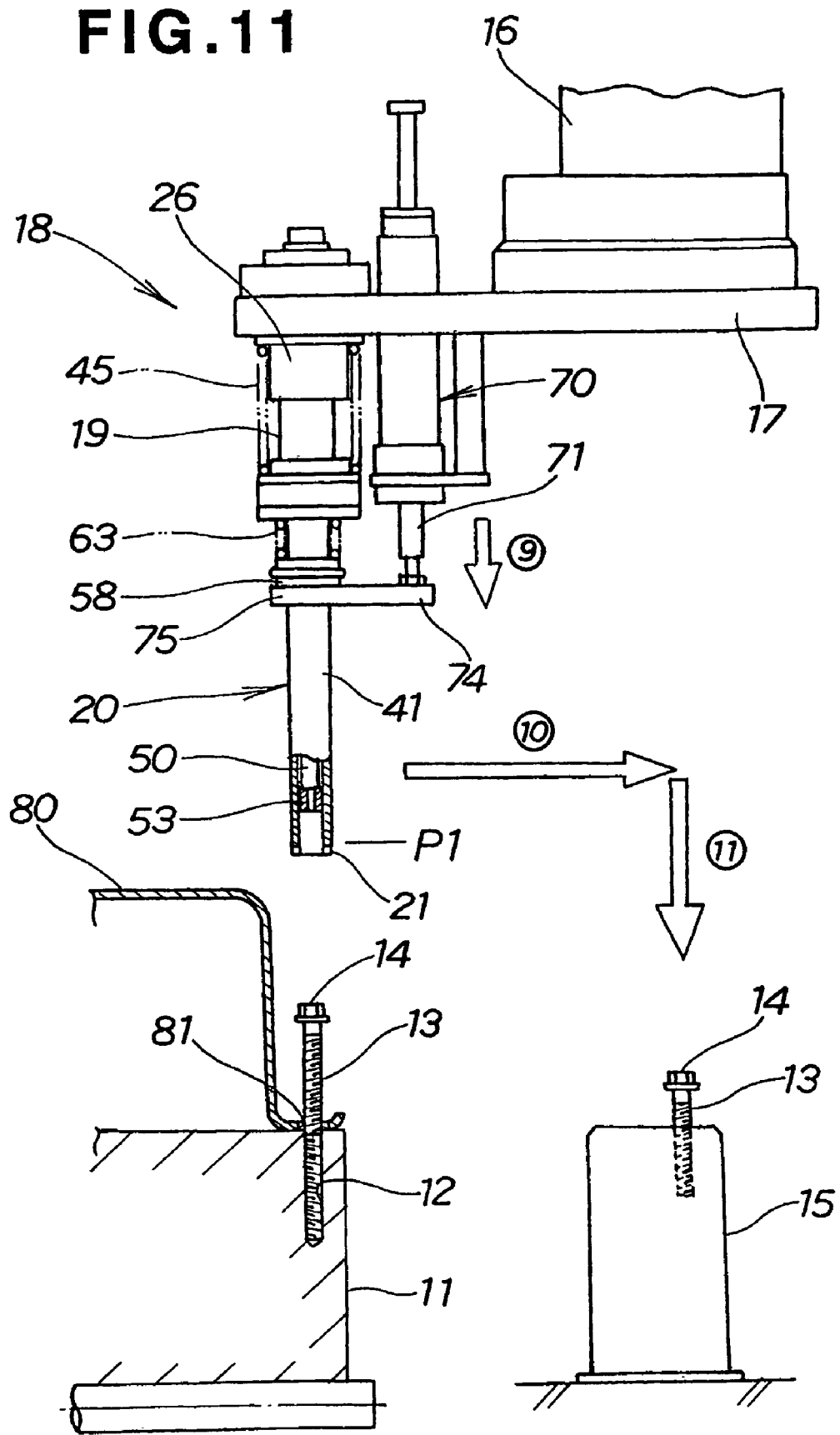
FIG. 11 shows the apparatus ready to perform again a series of operations shown in FIG. 6 to FIG. 10.

As shown in FIG. 11, the automatic robot arm 16 is lifted up to raise the apparatus to a predetermined level. Thereafter, the cylinder unit 70 is operated to advance the rod 71, as shown by an arrow ⑨. The advance of the rod 71 lowers the yoke 74 to thereby allow the second compression spring 58 to force the ring 58 downwardly.

The downward movement of the ring 58 causes the rod 50 to be lowered along with the magnet 53. This enables the magnet 53 to reaches the attracting position P1.

The robot arm 16 is operated to move the apparatus 10 horizontally, as shown by an arrow ⑩, thereby positioning the socket portion 21 into place above another hexagon head bolt 13 on the bolt-supplying section 15.

The apparatus 10 is then lowered, as shown by an arrow ⑪, to receive a head 14 of the bolt 13 within the socket portion 21.

Thereafter, the apparatus 10 repeatedly performs the series of operations as described with reference to FIG. 7A to FIG. 10 until the hexagon head bolts 13, by undergoing the temporary tightening operations, are screwed into all the screw-threaded apertures 12 of the crankcase 11.

The screw-threaded apertures 12 have their dimensions including tolerances. In some case, the hexagon head bolt 13 received within the socket portion 21 can be less precisely positioned in the screw-threaded aperture 12, as will be discussed hereinafter with reference to FIG. 12A through FIG. 14.

Figure 12A:
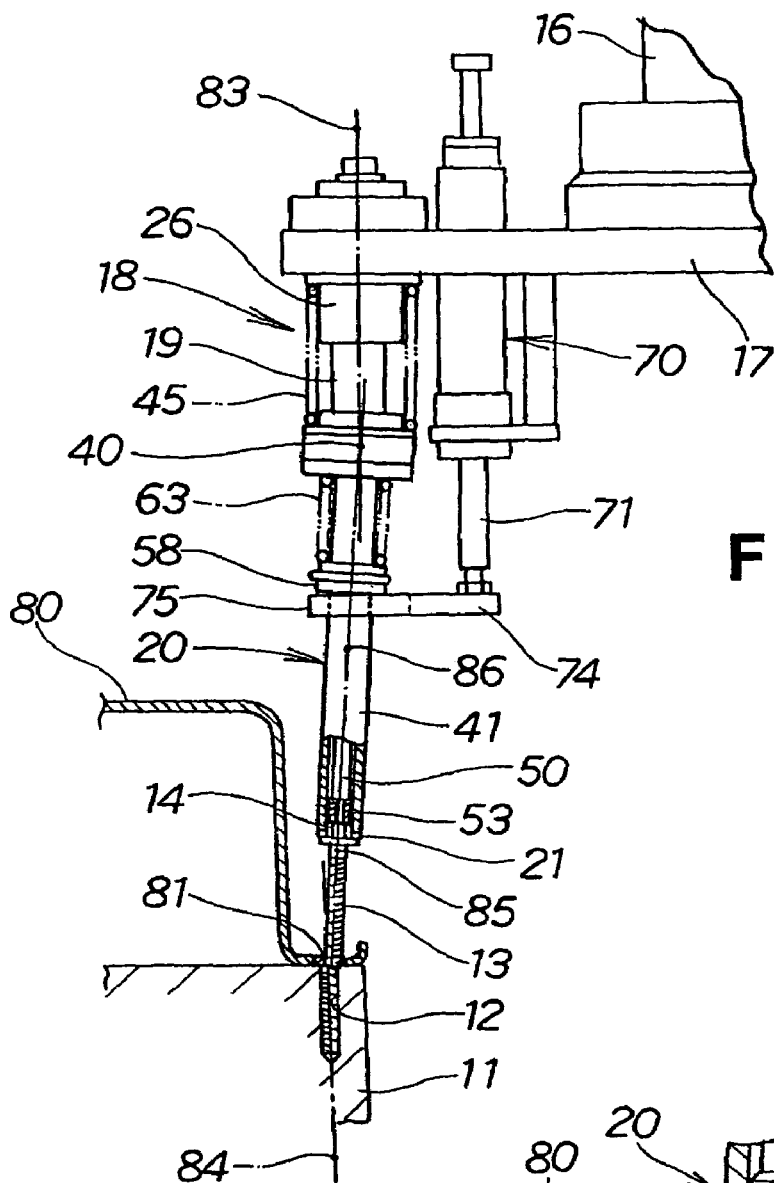
FIG. 12A shows the apparatus having a shaft member and a hexagon head bolt both of which are inclined and displaced out of vertical alignment with the aperture and FIG. 12B is an enlarged view of FIG. 12A showing the inclined, displaced bolt and the aperture.

As shown in FIG. 12A, when the automatic robot arm 16 stops in the temporary tightening position, a central axis 83 of the rotational shaft 19 is slightly displaced out of vertical alignment with a central axis 84 of the aperture 12. Such a displacement of the axis 83 from the axis 84 results from the dimensional tolerance of the aperture 12.

In this state, the apparatus 10 is lowered to thereby insert the lower end 13a of the bolt 13 into the mounting aperture 81 of the oil pan 80. The mounting aperture 81 is larger in diameter than the screw-threaded aperture 12, and hence the lower end 13a can be inserted through the aperture 81 even if the lower end 13a is slightly displaced out of vertical alignment with the aperture 12, as shown in FIG. 12A.

The shaft member 20 is held in a pivoted position where the hexagon head bolt 13 maintains its central axis 85 inclined relative to the axis 83 of the rotational shaft 19 and the axis 84 of the aperture 12.

Figure 12B:
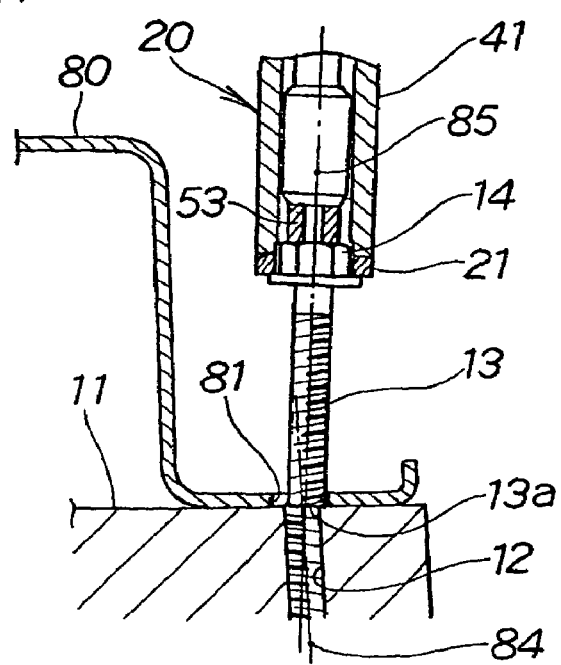

As shown in FIG. 12B, the lower end 13a of the bolt 13 is positioned within the aperture 81 and displaced out of vertical alignment with the aperture 12. The pivoted shaft member 20 is further pivoted on the center 40 to allow the distal end 13a of the bolt 13 received within the socket portion 21 to shift towards the center of the aperture 12 until the center of the lower end 13a coincides with the center of the aperture 12.

As shown in FIG. 13A, with the center of the distal end 13a positioned centrally of the screw-threaded aperture 12, the shaft member 20 is rotated clockwise to thereby rotate the hexagon head bolt 13 clockwise, as shown by an arrow, whereby the distal end 13a is screwed into the aperture 12 by the distance of the one to three times the pitch.

Reference is made to FIG. 13B. The bolt 13 is shown having undergone the temporary tightening operation, where the distal end 13a is screwed into the aperture 12 by the distance of the one to triple pitches. The central axis 84 of the screw-threaded aperture 12 is vertically aligned or coincided with the central axis 85 of the bolt 13. The inner periphery 23 of the socket portion 21 and the head 14 of the bolt 13 have a clearance C (shown in FIG. 13A) provided therebetween. Provision of such a clearance C allows the shaft member 20 to remain inclined relative to the bolt 13.

Figure 14:
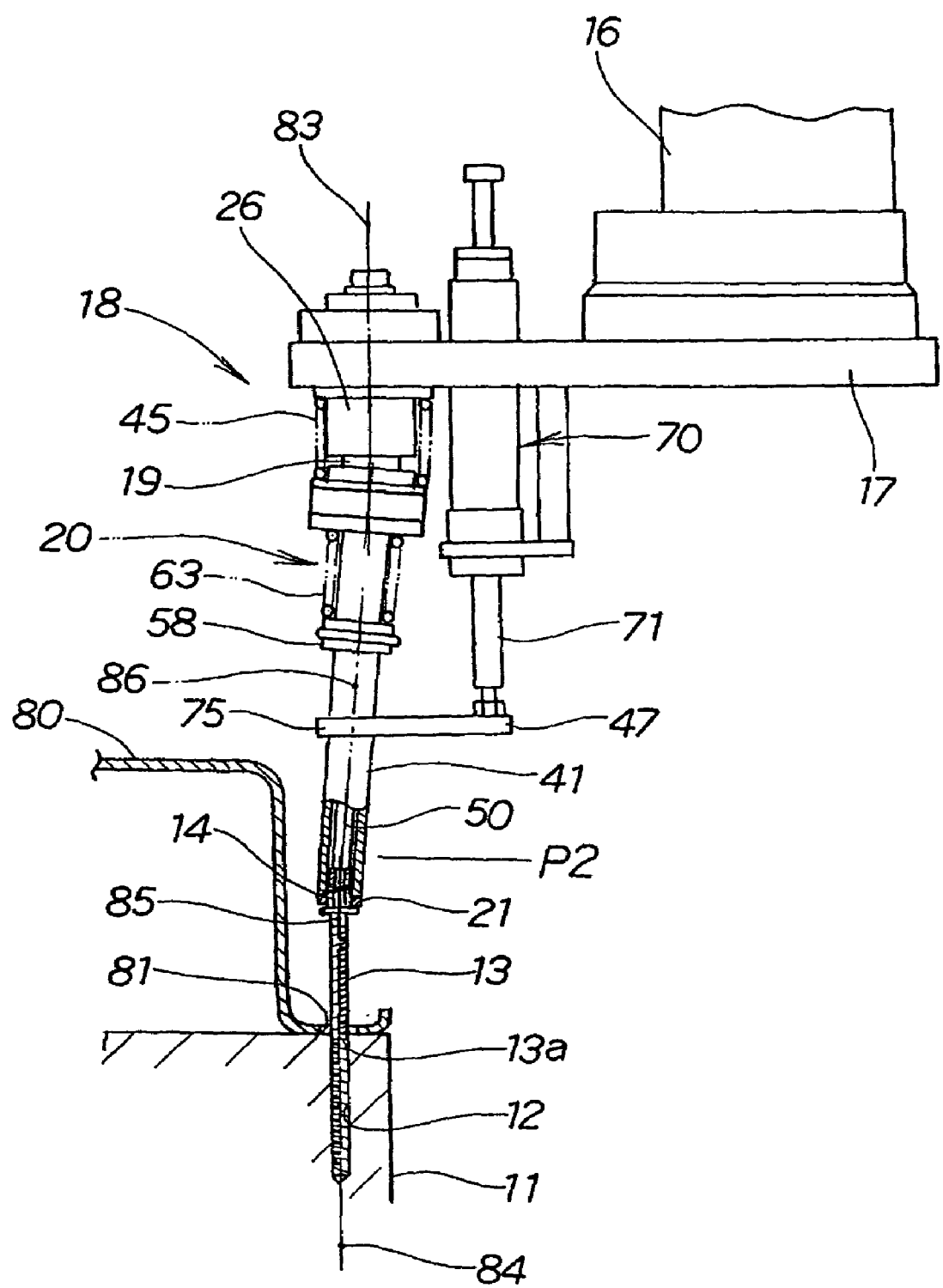
FIG. 14 shows the magnet raised to leave the bolt screwed into the aperture.

As shown in FIG. 14, after the temporary tightening operation is performed on the hexagon head bolt 13, the cylinder unit 70 is manipulated to raise the magnet 53 to the releasing position P2, leaving the central axis 85 of the bolt 13 coincided with the central axis 84 of the aperture 12.

The automatic robot arm 16 is then raised to move the apparatus 10 upwardly. Meanwhile, the bolt 13 having undergone the temporary tightening operation has its distal end left screwed into the aperture 12 by the one to three times the pitch.

As can be seen from the foregoing description, the shaft member 20 is pivotable on the center 40. The inner periphery 23 of the socket portion 21 and the head 14 of the bolt 13 have the clearance C provided therebetween.

The pivotal movement of the shaft member 20 allows the central axis 86 of the shaft member 20 to be inclined relative to the central axis 83 of the rotational shaft 19. The provision of the clearance allows the socket portion 21 to receive therein the head 14 of the bolt 13 having undergone the temporary tightening operation.

Even if the automatic robot arm 16 stops in the temporary tightening position with the central axis 83 of the rotational shaft 19 slightly displaced out of coincidence with the central axis 84 of the aperture 12, as shown in FIG. 12A, the temporary tightening operation can be successfully performed on the bolt 13 as described with reference to FIG. 13A, FIG. 13B and FIG. 14.

Thus, when the shaft member 20 is rotated, the hexagon head bolt 13 having its head 14 received within the socket portion 21 can be smoothly brought into threaded engagement with the screw-threaded aperture 12 of the crankcase 11.

Figure 15:
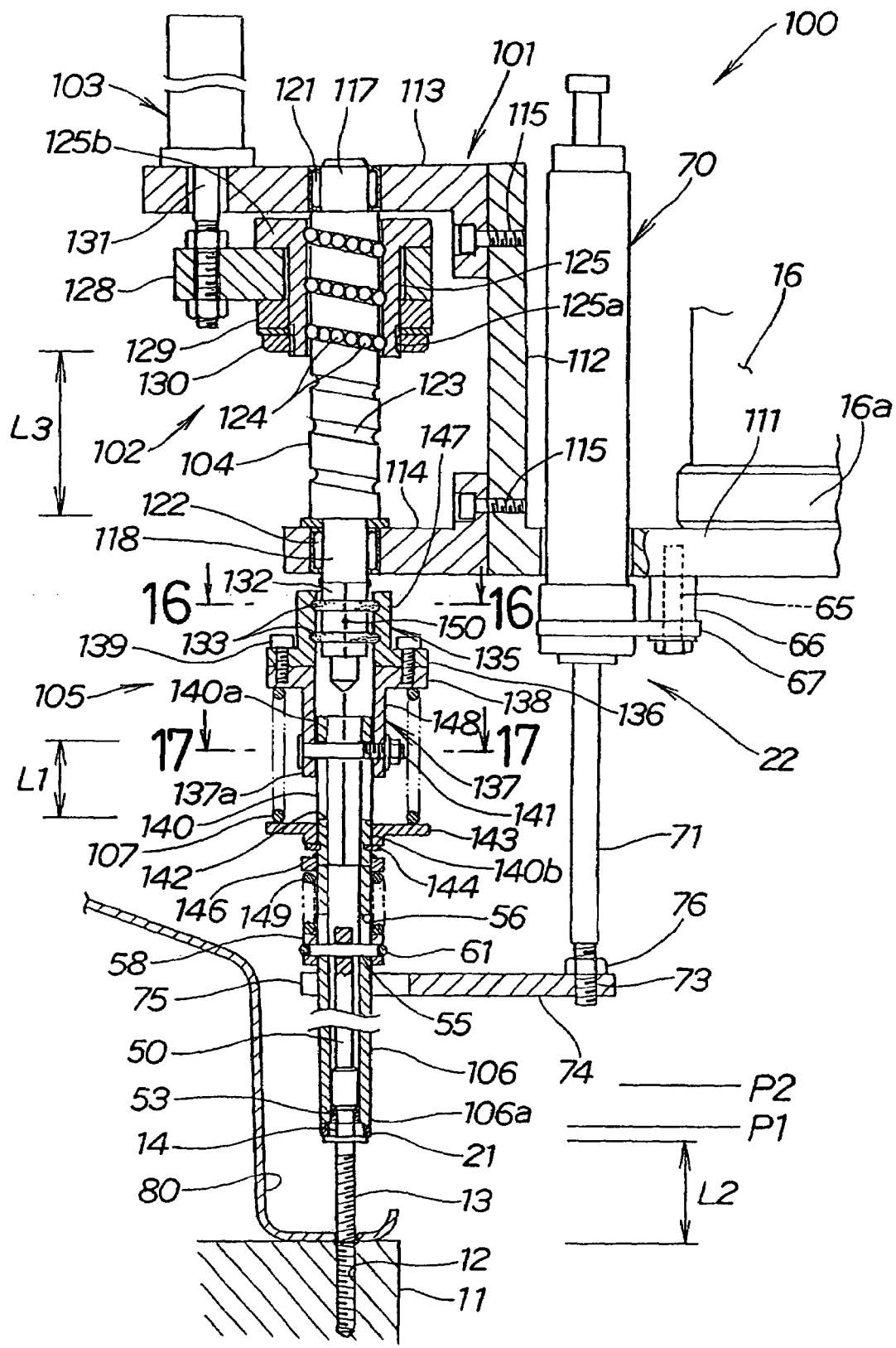
FIG. 15 shows an apparatus for tightening a threaded member in accordance with a second embodiment of the present invention.

FIG. 15 illustrates an apparatus 100 for tightening a threaded member according to a second embodiment of the present invention. In the illustrated embodiment, the threaded member is the hexagon head bolt 13 as described in the first embodiment of the present invention.

The apparatus 100 includes the automatic robot arm 16 and a screwing mechanism 102 provided to a lower end 16a of the arm 16 through a support part 101. The apparatus 100 further includes a lift cylinder 103 mounted to the support part 101 for operating the screwing mechanism 102. The mechanism 102 includes a rotational shaft (a rotational part) 104 having a shaft member 106 axially movably connected thereto via a slide part 105. The apparatus 100 includes a first compression spring 107 urging the shaft member 106 in a direction away from the rotational shaft 104. The shaft member 106 has the socket portion 21 provided at a lower end 106a thereof. The socket portion 21 is sized or designed to receive the head 14 of the bolt 13, as previously described. The shaft member 106 is rotatable to rotate the bolt 13 having its head 14 received within the socket portion 21. The apparatus 100 further includes the retention means 22 for retaining the head 14 received within the socket portion 21 or retaining the head 14 released from the socket portion 21. As will be explained later in detail, the cylinder 103 acts as an axially moving means for moving axially to rotate the rotational shaft 104. The compression spring 107 acts on an urging means for urging the shaft member 106.

The support part 101 includes an L-shaped bracket 111 mounted to the lower end 16a of the automatic robot arm 16. The bracket 111 includes a vertical portion 112, and upper and lower supporting portions 113, 114 attached via bolts 115 to the vertical portion 112.

The screwing mechanism 102 is provided to these supporting portions 113, 114.

The screwing mechanism 102 includes the rotational shaft 104 having its upper end 117 rotatably mounted within the upper supporting portion 113 by means of an upper bearing 121. The rotational shaft 104 has its lower end 118 rotatably mounted within the lower supporting portion 114 by means of a lower bearing 122. The rotational shaft 104 has a helical recess 123 formed thereon. The screwing mechanism 102 includes a threaded engagement member 125 vertically movably fitted round the recess 123 with balls 124 disposed along the recess 123.

The threaded engagement member 125 is movable downwardly along the axis or length of the rotational shaft 104 to rotate the rotational shaft 104 clockwise. Likewise, the threaded engagement member 125 is movable upwardly along the axis or length of the rotational shaft 104 to rotate the rotational shaft 104 counterclockwise.

The bearings 121, 122 are oilless ones but other types of bearings may be used which serve the same functions as bearings 121, 122.

The threaded engagement member 125 has a connection member 128 and a spacer 129 fitted round an outer periphery thereof. The outer periphery of the member 125 includes a lower screw-threaded portion 125a having a nut 130 tightened thereonto. The threaded engagement member 125 has a flange 125b formed at an upper portion thereof. The flange 125b and the spacer 129 holds the connection member 128 therebetween to attach the connection member 128 to the threaded engagement member 125.

The cylinder 103 is mounted on the upper supporting portion 113. The cylinder 103 has a piston rod 131 attached to the connection member 128.

The piston rod 131 can be advanced to cause the connection member 128 to lower the threaded engagement member 125. This enables the rotational shaft 104 to rotate clockwise. The piston rod 131 can be retracted to cause the connection member 128 to raise the threaded engagement member 125. This enables the rotational shaft 104 to rotate counterclockwise.

The lower end 118 of the rotational shaft 104 protrudes downwardly from the lower supporting portion 114. The lower end 118 has a shaft portion 132 coaxially fixed thereto. The shaft portion 132 is hexagon in cross-section. The shaft portion 132 of hexagonal cross-section is mounted to an upper cylinder member 135 with upper and lower O rings 133, 133 interposed therebetween.

The O rings 133, 133 can be compressed to allow the slide part 105 to pivot on a center 150 of the shaft portion 132.

The upper cylinder member 135 has a flange 136 fixed to a flange 138 of a lower cylinder member 137 through hexagon head bolts 139. The flanges 136, 138 are in coaxial relation to each other. The slide part 105 has a slider 140 telescoped or inserted into the lower cylinder member 137 from below. The slider 140 has its upper end 140a connected to a lower end 137a of the lower cylinder member 137 through a mounting bolt 141.

The slider 140 has vertically elongated apertures 142, 142 formed to extend laterally therethrough. The apertures 142, 142 are defined between upper and lower ends 140a, 140b of the slider 140. The mounting bolt 141 is laterally inserted through the apertures 142, 142. The apertures 142, 142 vertically extend a distance L1.

The mounting bolt 141 is mounted to the lower cylinder member 137 in such a manner as to allow the slider 140 to move vertically by the distance L1.

The distance L1 is set to be slightly larger than a length L2 of the bolt 13.

The slider 140 has a lower flange 143 fitted around the lower end 140*b*. The lower flange 143 has a snap ring 144 abutted on a lower end thereof. The snap ring 144 prevents the flange 143 from shifting downwardly.

The snap ring 144 is locked in place in a groove formed on an outer peripheral surface of the lower end 140*b*.

The lower flange 143 and the flange 138 of the lower cylinder member 137 have the first compression spring 107 disposed therebetween. The spring 107 produces and transmits a force to the slider 140 through the lower flange 143 and the snap ring 144 to thereby depress the slider 140.

Because the slider 140 is pushed downwardly by the first compression spring 107, the upper end 140*a* of the slider 140 abuts against the mounting bolt 141. In this state, the slider 140 remains urged in such a manner as to project downwardly from the lower cylinder member 137 by a maximum distance.

The shaft member 106 is secured via a fixing ring 146 to the lower end 140*b* of the slider 140 in coaxial relation thereto. The shaft member 106 corresponds to the shaft member 20 as previously described in the first embodiment. The fixing ring 146 and the ring 58 have a second compression spring 149 disposed therebetween. The ring 58 is pushed downwardly by the spring 149 to bring the pin 55 into abutment on the lower ends 56*a*, 56*a* (shown in FIG. 4).

This enables the magnet 53 to be held in the attracting position P1 where the head 14 of the bolt 13 is magnetically held to the magnet 53.

The cylinder unit 70 of the retention means 22 is operable to retract the rod 71 whereby the yoke 74 is raised to cause the claws 75, 75 to move the ring 58 upwardly against a force produced by the second compression spring 149. Upon the upward movement of the ring 58, the pin 55 is raised along the apertures 56, 56.

The upward movement of the pin 55 causes the rod 50 to be raised together with the magnet 53. Consequently, the magnet 53 reaches the releasing position P2.

The shaft member 106 is mounted to the lower end 140*b* of the slider 140. Compression of the upper and lower O rings 133, 133 allows the slide part 105 to pivot on the center 150 relative to the shaft portion 132. At this time, the shaft member 106 is pivoted in unison with the slider 140.

Figure 16:
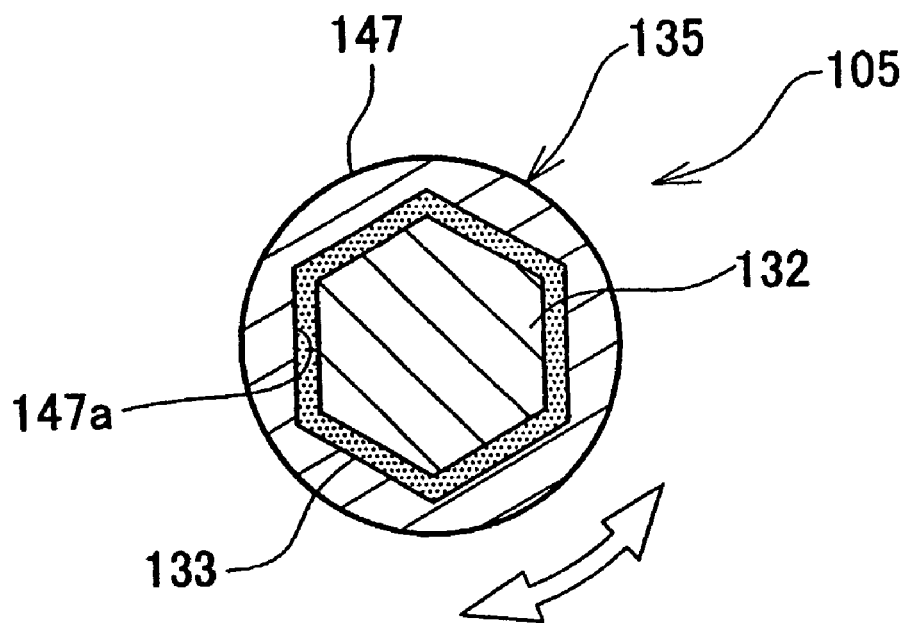
FIG. 16 is a cross-sectional view taken along line 16—16 of FIG. 15.

Referring to FIG. 16, the upper cylinder member 135 includes a cylinder body 147. The cylinder body 147 has its inner periphery 147*a* of hexagonal cross-section. The shaft portion 132 is fitted within the cylinder body 147 with the upper and lower O rings 133, 133 (the lower one of which is shown in FIG. 15) interposed therebetween. Thus, the slide part 105 is mounted to the shaft portion 132 through the O rings 133, 133, the upper cylinder member 135, the lower cylinder member 137 and the mounting bolt 141.

When the shaft portion 132 is rotated either clockwise or counterclockwise, as shown by an arrow, the O rings 133, 133 transmits the rotation of the shaft portion 132 to the cylinder body 147. Therefore, the slide part 105 is rotated in unison with the shaft portion 132.

In the second embodiment, the inner periphery 147*a* is formed to provide the hexagonal cross-section, but may be of circular, octagonal or other polygonal cross-section to serve the same function as discussed above.

Figure 17:
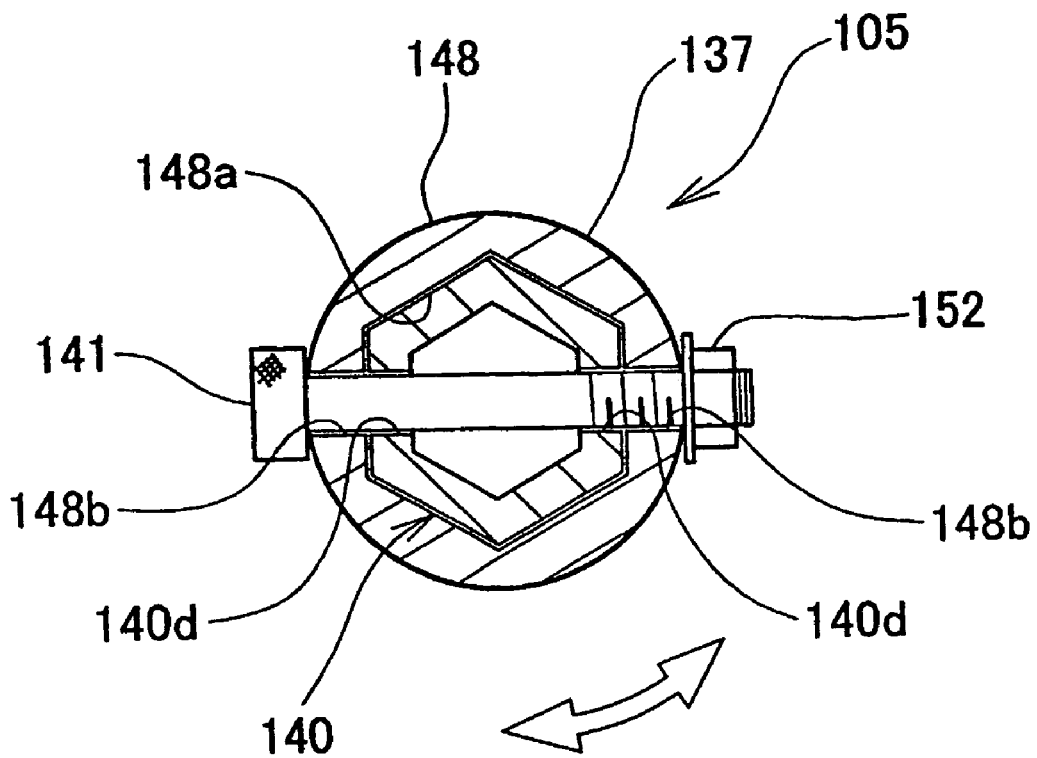
FIG. 17 is a cross-sectional view taken along line 17—17 of FIG. 15.

Referring to FIG. 17, the lower cylinder member 137 includes a cylinder body 148. The cylinder body 148 has its inner periphery 148*a* formed to provide a hexagonal cross-section.

The slider 140 is a pipe of hexagonal cross-section and is telescoped or inserted into the cylinder body 148.

The cylinder body 148 has mounting apertures 148*b*, 148*b* formed to laterally extend therethrough. The slider 140 has mounting apertures 140*d*, 140*d* formed to laterally extend therethrough. The mounting bolt 141 is inserted through the apertures 148*b*, 148*b*, 140*d*, 140*d*.

The mounting bolt 141 has a nut 152 tightened thereonto to mount the slider 140 to the cylinder body 148.

Providing the inner periphery 148*a* and the slider 140 with the hexagonal configuration enables transmission of clockwise or counterclockwise rotation of the lower cylinder member 137 to the slider 140. Thus, the lower cylinder member 137 can be rotated clockwise or counterclockwise in unison with the slider 140, as shown by an arrow.

In the second embodiment of the present invention, the slider 140 is a hollow pipe of hexagonal cross-section but may be of rectangular or other polygonal cross-section, or be in the form of a solid hexagonal prism.

Now, discussion will be made with reference to FIG. 18 and FIG. 19 as to how the apparatus 100 performs the temporary tightening operation on the bolt 13.

Figure 18:
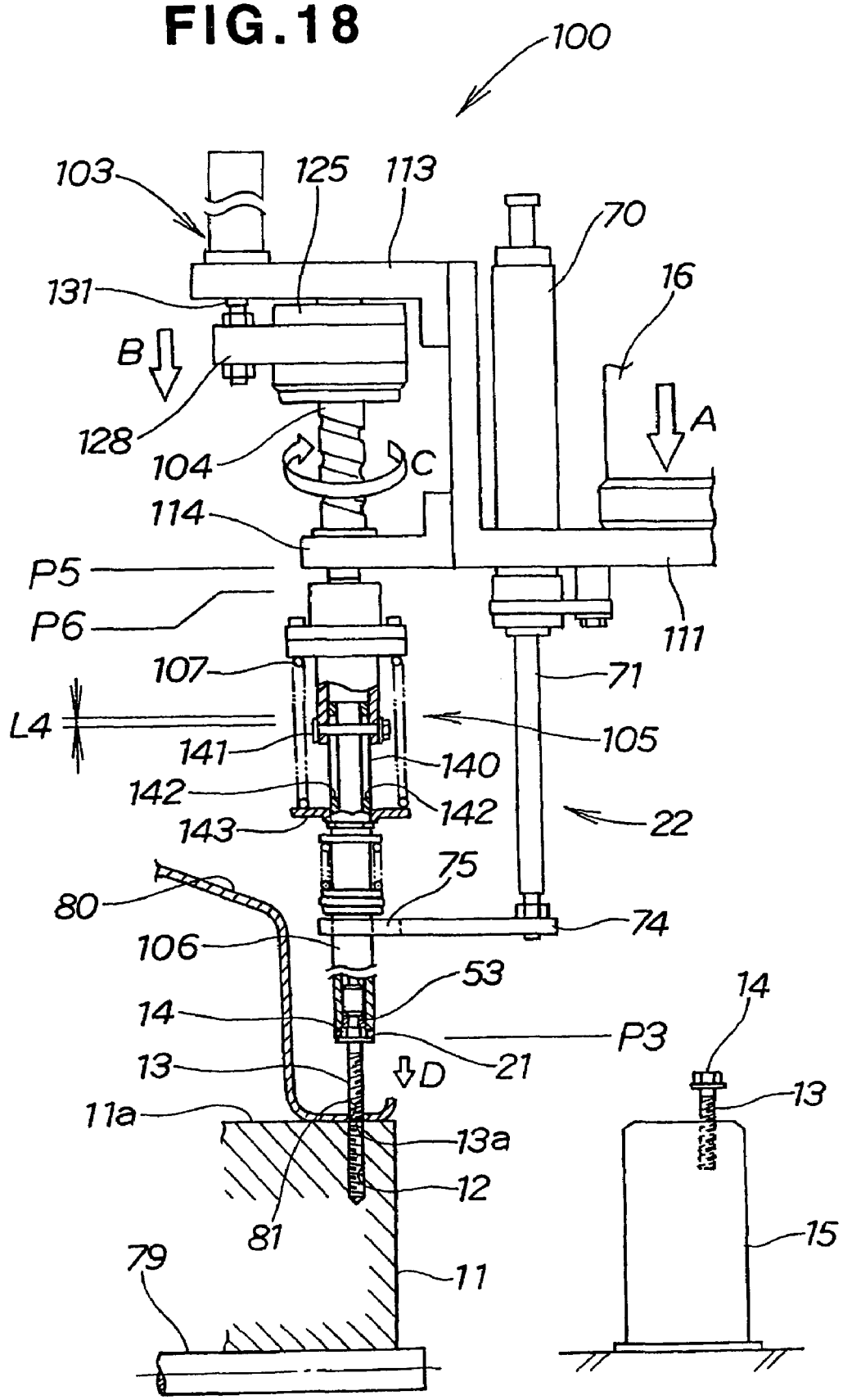
FIG. 18 shows the apparatus having the magnet and the socket portion receiving a hexagon head bolt held to the magnet.

Reference is first made to FIG. 18. As discussed in relation to FIG. 6, the crankcase 11 is tuned upside down and then is placed onto the rollers 79. The oil pan 80 is placed on the bottom surface 11*a* of the crankcase 11. The crankcase 11 and the oil pan 80 rollers 79 are carried into position below the apparatus 100.

Meantime, the head 14 of the hexagon head bolt 13 disposed in the bolt-supplying section 15 is received within the socket portion 21 and then is magnetically held to the magnet 53.

With the head 14 magnetically held to the magnet 53, the automatic robot arm 16 is moved to insert the lower end 13*a* of the bolt 13 though the mounting aperture 81 into the screw-threaded aperture 12. The lower end 13*a* is thus set in position in the screw-threaded aperture 12 in preparation for temporary tightening operation.

The head 14 of the bolt 13 is in a position P3 while the lower supporting portion 114 is in a set position P5.

Next, the automatic robot arm 16 is operated to move the apparatus 100 downwardly, as shown by an arrow A. During the downward movement of the apparatus 100, the lower end 13*a* of the bolt 13 remains set in the aperture 12 without moving downwardly. Therefore, the bolt 13 is maintained in a stationary position without moving downwardly.

The downward movement of the apparatus 100 compresses the first compression spring 107. The compression of the spring 107 allows the mounting bolt 141 to move down by a distance L4 along the apertures 142, 142. During the downward movement of the mounting bolt 141, the lower cylinder member 137 is downwardly slid relative to the slider 140. The lower supporting portion 114 is thus lowered to a position P6 so that the bolt 13 is subjected to the temporary tightening operation.

The cylinder 103 is operated to advance the piston rod 131. This causes the connection member 128 to lower the threaded engagement member 125, as shown by an arrow B. The rotational shaft 104 is therefore rotated clockwise as shown by an arrow C.

The clockwise rotation of the rotational shaft 104 is transmitted via the slide part 105 to the shaft member 106. Upon the clockwise rotation of the shaft member 106, the hexagon head bolt 13 is rotated clockwise together with the socket portion 21 provided to the lower or distal end of the shaft member 106.

During the rotation of the bolt 13, the first compression spring 107 forces the lower flange 143 to push the shaft member 106 downwardly. The force with which the shaft member 106 is pushed downwardly is applied through the socket portion 21 to the hexagon head bolt 13. Undergoing such a downwardly pushing force, the bolt 13 is lowered as shown by an arrow D.

Figure 19:
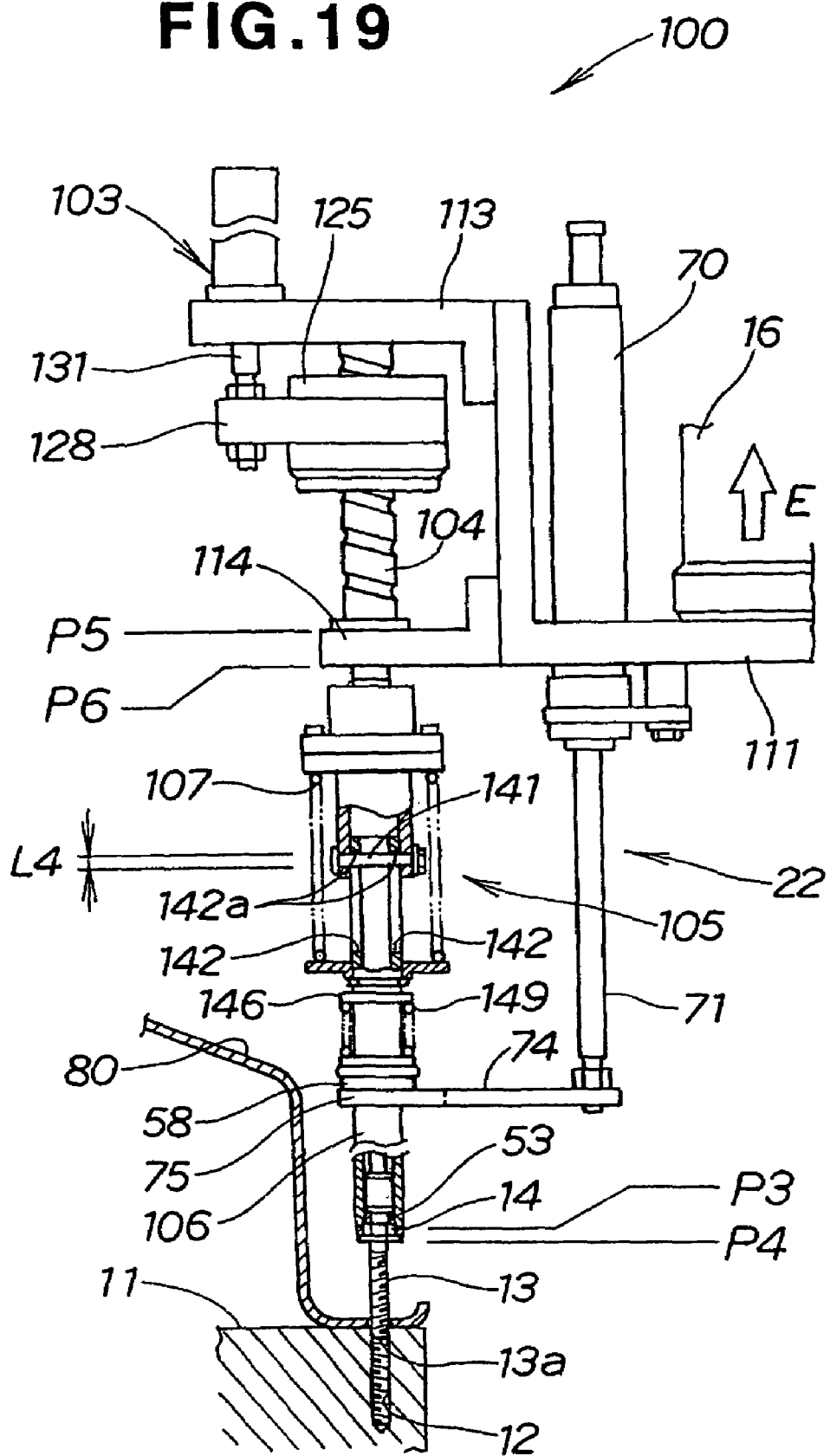
FIG. 19 shows the apparatus having the socket portion turned, with the bolt held to the magnet, to screw the bolt into the aperture by a distance of one to triple pitches.

As shown in FIG. 19, while rotating clockwise, the head 14 of the hexagon head bolt 13 is lowered from the position P3 to a position P4. This enables the lower end 13a of the bolt 13 to be screwed into the threaded aperture 12 by the distance of not more than three times the pitch so as to complete the temporary tightening operation.

The retention means 22 is then operated to raise the magnet 53 in the manner as stated in the first embodiment. As a result, the head 14 of the bolt 13 is released from the magnet 53.

Leaving the head 14 of the bolt 13 released from the magnet 53, the automatic robot arm 16 is operated to raise the apparatus 100, as shown by an arrow E.

The lower supporting portion 114 is thus moved up from the position P6 to the set position P5. During the upward movement of the lower supporting portion 114, the mounting bolt 141 is raised a distance L4 along the vertically elongated apertures 142, 142. During the upward movement of the mounting bolt 141, the lower cylinder member 137 is upwardly slid relative to the slider 140. The shaft member 106 is maintained in a stationary position.

By moving up the distance L4, the mounting bolt 141 comes into abutment on lower surfaces 142a, 142a of the upper end 140a of the slider 140.

With the mounting bolt 141 thus abutted on the lower surfaces 142a, 142a, the automatic robot arm 16 continues to be operated to further raise the apparatus 100 as shown by an arrow E.

This force with which the arm 16 of the apparatus 100 is moved further upwardly is transmitted via the mounting bolt 141 to the shaft member 106. The shaft member 106 is thus raised to move the socket portion 21 away from the head 14 of the hexagon head bolt 13.

The series of operations as described in relation to FIG. 18 and FIG. 19 is repeatedly carried out until all the screw-threaded apertures 12 of the crankcase have the bolts 13 subjected to the temporary tightening operations, as described in the first embodiment.

As can be seen from the foregoing, the temporary tightening operation can be automatically performed on the bolt 13. Namely, an operator need not manually screw the bolt into the screw-threaded aperture 12.

The temporary tightening operation on the bolt 13 can be automated without requiring the operator's manual labor. This means that the temporary tightening operation can be steadily carried out for a long time with increased efficiency.

In the second embodiment, the lift cylinder 103 is operated to move the threaded engagement member 125 up and down along an axial direction of the rotational shaft 104. This movement of the member 125 rotates the rotational shaft 104 clockwise or counterclockwise.

Therefore, the hexagon head bolt 13 can be rotated in such a direction as to tighten or loosen. This arrangement is advantageous in that the bolt 13 is not seized up within the threaded aperture 12 or is smoothly loosened out of the aperture 12 when rotated counterclockwise.

The screw-threaded apertures 12 have their dimensions including tolerances. In some case, the hexagon head bolt 13 received within the socket portion 21 can be less precisely positioned in the screw-threaded aperture 12, as will be discussed hereinafter with reference to FIG. 20.

Figure 20:
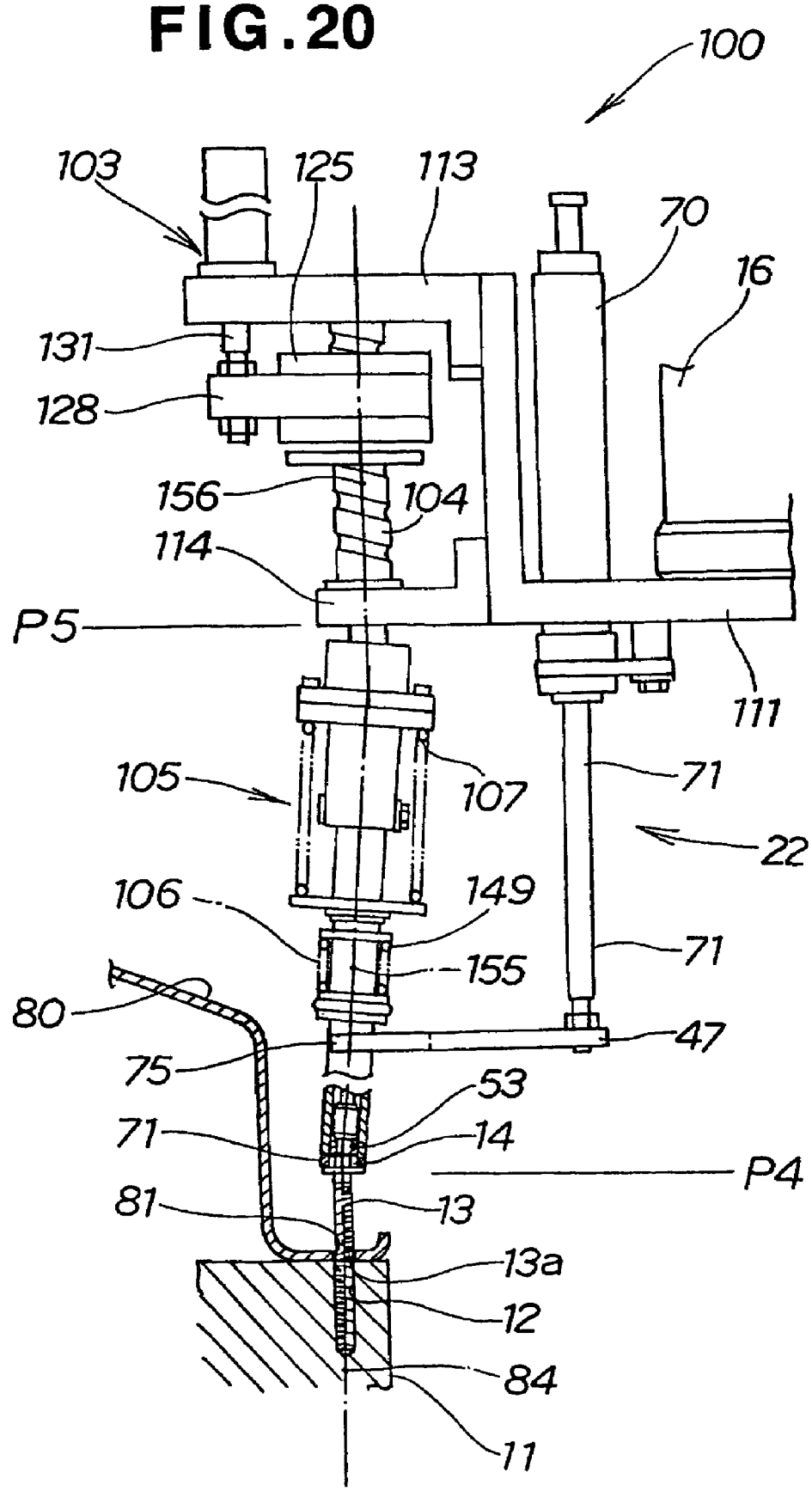
FIG. 20 shows the apparatus having a shaft member and the socket portion turned in an inclined position to screw a hexagon head bolt into the aperture by a distance of one to triple pitches.

As shown in FIG. 20, due to such dimensional tolerances, the shaft member 106 has its central axis 155 slightly inclined relative to the central axis 84 of the aperture 12 when the automatic robot arm 16 is operated to place the lower supporting portion 114 of the apparatus 100 in the set position P5.

With the central axis 155 of the shaft member 106 slightly inclined relative to the central axis 84 of the screw-threaded aperture 12, the bolt is subjected to the temporary tightening operation, in other words, the lower end 13a of the bolt 13 is screwed into the aperture 12 by the distance of one to triple pitches to bring the central axis of the bolt 13 into coincidence with the central axis 84 of the aperture 12.

Since the clearance C is provided between the inner periphery 23 of the socket portion 21 and the head 14 of the hexagon head bolt 13, as shown in FIG. 13A, the shaft member 106 can be held in the inclined position.

Compressing the upper and lower O rings 133, 133 (see FIG. 15) causes the shaft member 106 to pivot together with the slider 140 relative to the rotational shaft 104.

This pivotal movement of the shaft member 106 guides the lower end 13a of the bolt 13 into position in the screw-threaded aperture 12. The bolt 13 is then subjected to temporary tightening operation. Thus, the temporary tightening operation can be reliably performed on the bolt 13 even if the lower end 13a of the bolt 13 is positioned out of vertical alignment with the aperture 12.

Because the slide part 105 is pivotably connected to the rotational shaft 104, the slide part 105 can be pivoted in unison with the shaft member 106 on the center 150 relative to the rotational shaft 104. The lower end 13 of the bolt 13 received within the socket portion 21 is free to move horizontally upon such pivotal movement of the shaft member 106.

Even if the lower end 13a of the bolt is displaced out of vertical alignment with the aperture 12 of the crankcase 11, the lower end 13a can be moved into position in the aperture 12 for subsequent temporary tightening operation.

As discussed above, there is provided the clearance C (shown in FIG. 13A) between the inner periphery 23 of the socket portion 21 and the head 14 of the bolt 13.

The shaft member 106 has its central axis 155 inclined relative to a central axis 156 of the rotational shaft 104 while the head 14 of the hexagon head bolt 13 undergone the temporary tightening operation is received within the socket portion 21.

Even if the central axis 155 of the shaft member 106 is slightly inclined relative to the central axis 84 of the aperture 12 with the automatic robot arm 16 held in place for temporary tightening operation, the bolt 13 can reliably undergo the temporary tightening operation.

The thus above-mentioned apparatus 100 can be used to perform not only the temporary tightening operation but the final tightening operation on the bolt 13.

Discussion will be made with respect to FIG. 15, FIG. 21 and FIG. 22 as to the apparatus 100 is operated to carry out the final tightening operation on the hexagon head bolt 13.

Referring back to FIG. 15, each vertically elongated aperture 142 of the slider 140 has its length L1 set to be slightly larger than the length L2 of the bolt 13. The threaded engagement member 125 is downwardly moved a distance L3 necessary to perform the final tightening operation on the bolt 13.

Figure 21:
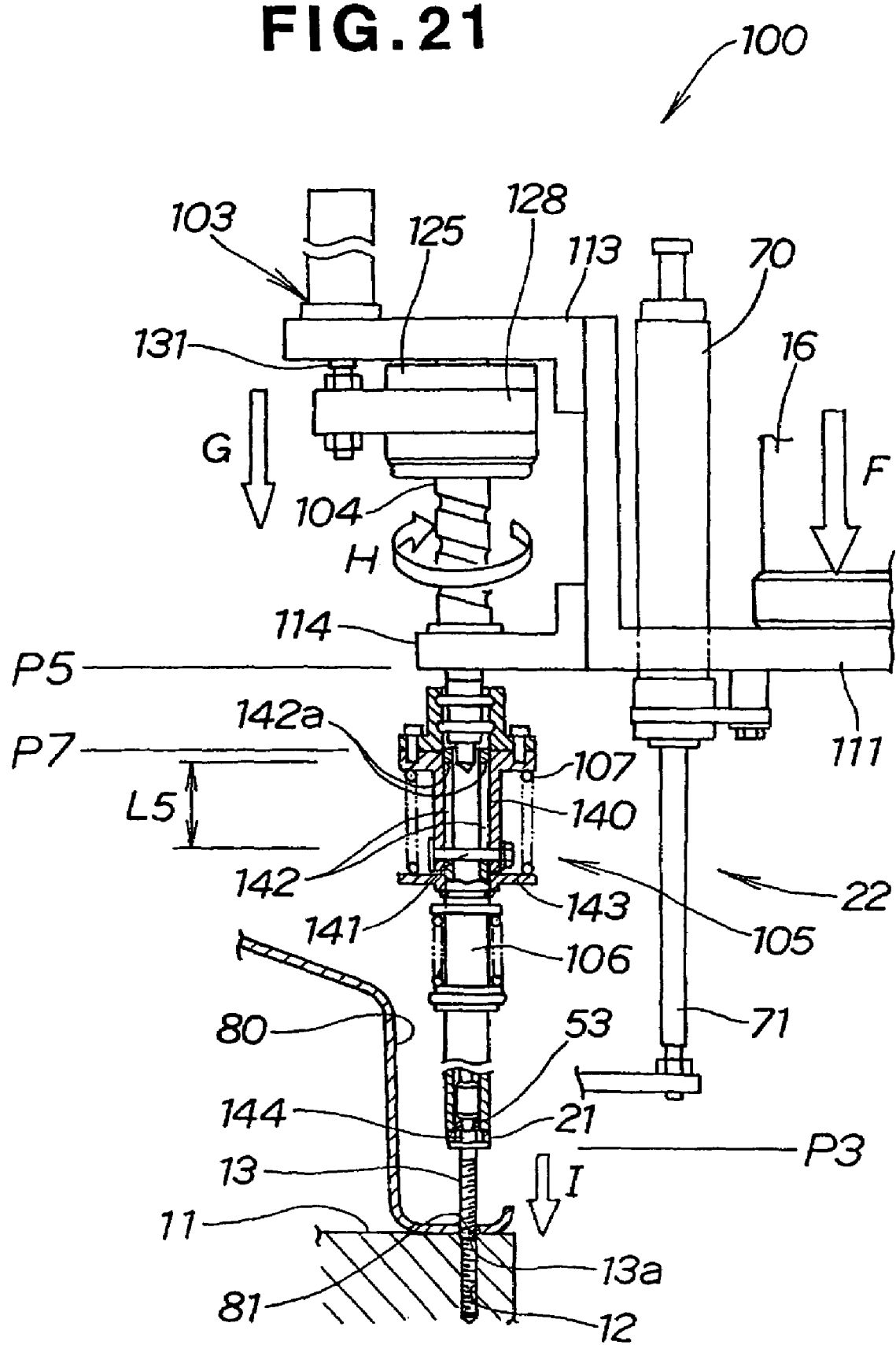
FIG. 21 shows the apparatus having the shaft member and the socket portion turned to screw a hexagon head bolt into the aperture by the overall length of the bolt.

As shown in FIG. 21, the head 14 of the bolt 13 is received within the socket portion 21 and magnetically held to the magnet 53.

With the head 14 thus received within the socket portion 21 and held to the magnet 53, the automatic robot arm 16 is operated to move the apparatus 100, such that the lower end 13a of the bolt 13 is inserted through the mounting aperture 81 of the oil pan 80 into the aperture the screw-threaded aperture 12. Consequently, the lower end 13a of the bolt 13 is set in place in the aperture 12.

At this time, the head 14 of the bolt 13 is in the position P3 while the L-shaped bracket 111 is in the position P5.

The automatic robot arm 16 is operated to lower the apparatus 100 as shown by an arrow F. During the downward movement of the apparatus 100, the bolt 13 remains set in place in the aperture 12 without moving down.

The first compression spring 107 is compressed to allow the mounting bolt 141 to be moved a distance L5 along the apertures 142, 142. The lower supporting portion 114 is thus moved down from the set position P5 to a position P7 in preparation for final tightening operation.

The piston rod 131 of the cylinder 103 is advanced to cause the connection member 128 to lower the threaded engagement member 125, as shown by an arrow G, to rotate the rotational shaft 104 clockwise as shown by an arrow H.

The clockwise rotation of the rotational shaft 104 is transmitted via the slide part 105 to the shaft member 106. Thus, the shaft member 106 is rotated in unison with the socket portion 106 clockwise in the direction of arrow H.

During the clockwise rotation of the shaft member 106, the first compression spring 107 applies a downward force to the shaft member 106 via the lower flange 143. The shaft member 106 is thus pushed downwardly. Such a downward pushing force is applied to the socket portion 21 and the hexagon head bolt 13, too. The bolt 13 is therefore lowered as shown by an arrow I.

Figure 22A:
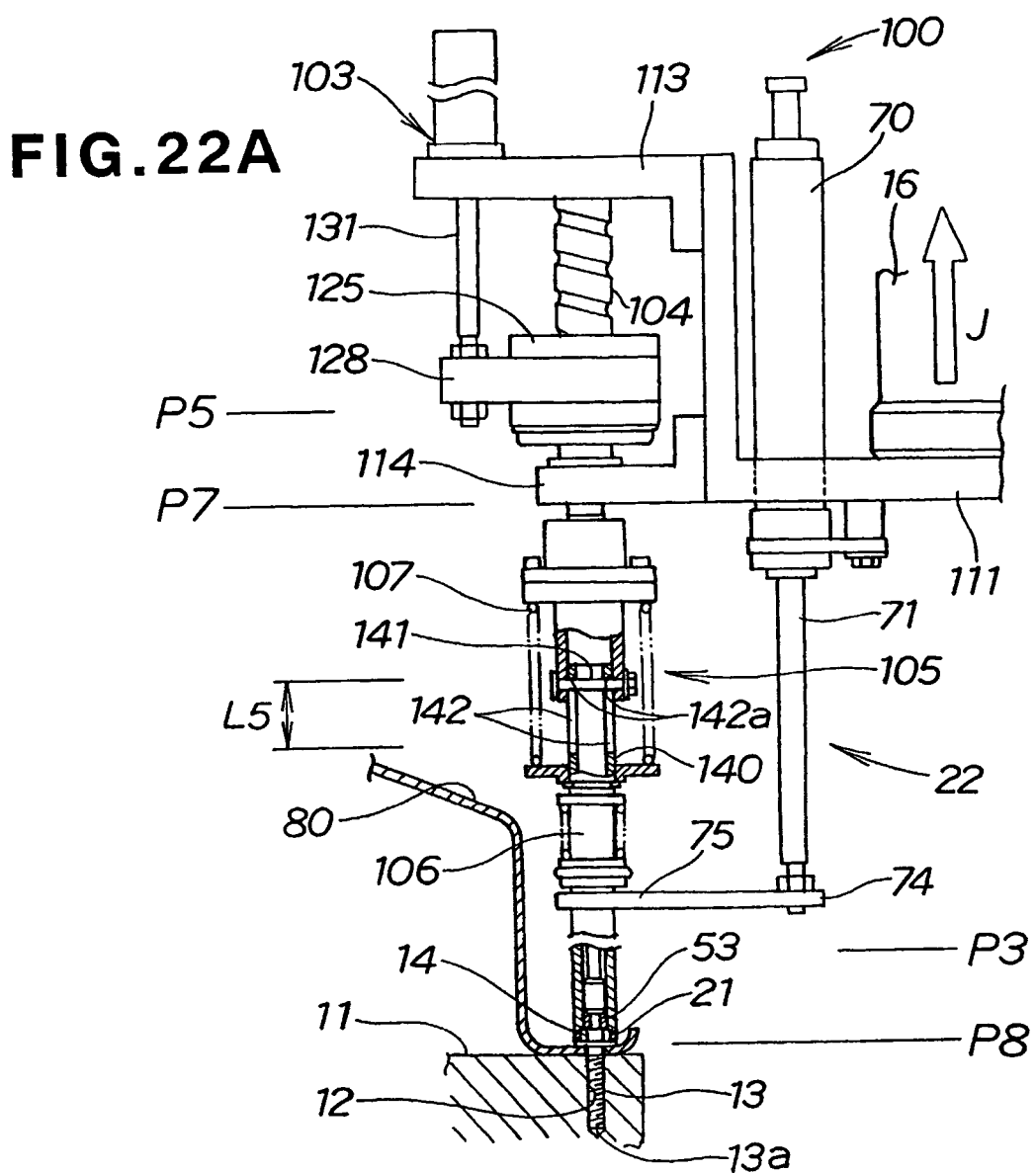
FIG. 22A shows the apparatus raised with the shaft member and the socket portion held in a stationary position and FIG. 22B shows the apparatus further raised to lift the shaft member and the socket portion off the bold screwed into the aperture.

Referring to FIG. 22A, the bolt 13 is rotated clockwise to thereby screw the distal end 13a into the screw-threaded aperture 12 until the head 14 of the bolt 13 is moved downwardly from the position P3 to a position P8. With the head 14 in the position P8, the bolt 13 is tightened within the aperture 12 throughout the length thereof. Namely, performing the final tightening operation on the bolt 13 is terminated.

After the bolt 13 undergoes the final tightening operation, the retention means 22 is operated to raise the magnet 53 in the manner as described in the first embodiment. The automatic robot arm 16 is then operated to raise the apparatus 100, as shown by an arrow J. This causes the lower supporting portion 114 to move up from the position P7 to the set position P5.

Until the lower supporting portion 114 reaches the set position P5, the shaft member 106 remains unmoved. Meanwhile, the mounting bolt 141 is raised the distance L5 along the apertures 142, 142.

By rising the distance L5, the mounting bolt 141 abuts on the lower surfaces 142a, 142a of the upper end 140a. The automatic robot arm 16 keeps operating to further move the apparatus 100 upwardly, as shown by an arrow J.

Figure 22B:
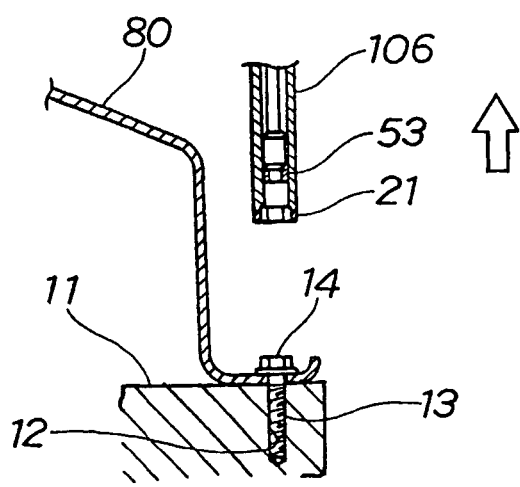
Figure 23:
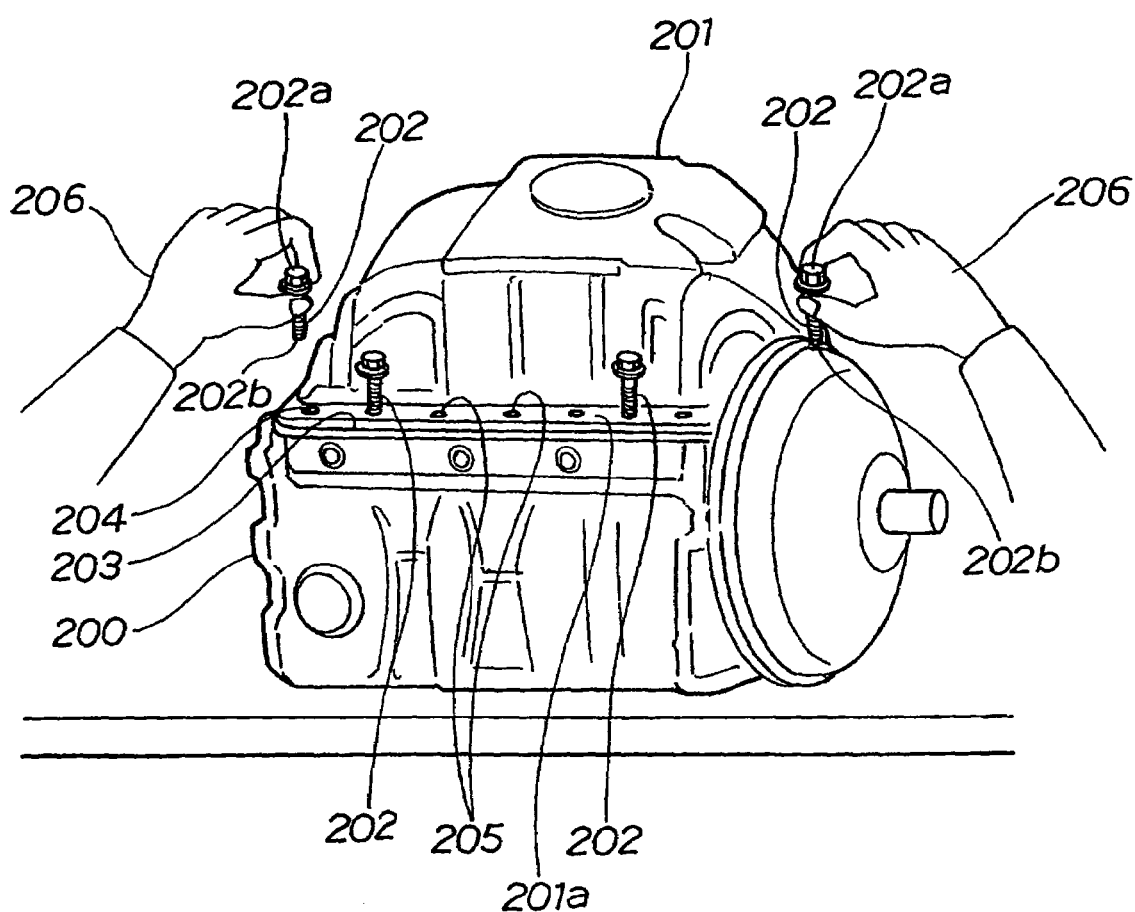
FIG. 23 shows operator's hands each of which has an index finger and a thumb holding a bolt therebetween so as to tighten the bolt into a threaded aperture of a crankcase.

As shown in FIG. 22B, the force the robot arm 16 produces to raise the apparatus 100 is transmitted via the mounting bolt 141 to the shaft member 106. The shaft member 106 is thus raised, whereby the socket portion 21 is moved up away from the head 14 of the bolt 13 with the magnet 53 in the aforementioned releasing position P2.

The apparatus 100 repeats the series of operations as described with respect to FIG. 21, FIG. 22A and FIG. 22B until the all the screw-threaded apertures 12 of the crankcase 11 have the bolts 13 subjected to the final tightening operation.

It is to be noted that the apparatus 100 performs the final tightening operation on the bolt 13 in the manner as stated with reference to FIG. 21, FIG. 22A and FIG. 22B even if the central axis 155 of the shaft member 106 is inclined relative to the central axis 84 of the aperture 12 as shown in FIG. 20.

The apparatus 100 arranged to perform the final tightening operation as well as the temporary tightening operation can be used in wide variety of cases.

The socket portion 21 may have its inner periphery 23 of dodecagon, for example.

The socket portion 21 may be configured to receive any bolt other than the hexagon head bolt 13.

In the apparatus 100, in place of the cylinder unit 70, there may be employed a ball screw designed to serve the same function as the cylinder unit 70.

The cylinder unit 70 has been described which includes the rod 71 protruding from the opposite ends thereof, however, it may have the rod 71 protruding only from the one end thereof.

In the illustrated embodiments, the bolt 13, by undergoing the temporary tightening operation, has its distal end 13a screwed into the aperture 12 of the crankcase 11, as discussed above. It will be appreciated that the temporary tightening operation may be carried out on the bolt 13 to screw its distal end into aperture of any workpiece other than the crankcase 11.

In the illustrated embodiments, when the bolt is subjected to the temporary tightening operation, the distal end of the bolt is screwed into the aperture 12 of the crankcase 11 by the distance of the one to triple pitches. It will be understood that the distal end of the bolt is screwed into the aperture of the crankcase 11 by a distance of more than three times the pitch.

The apparatus 100 may be altered such that the cylinder 103 is operated to raise the threaded engagement member 125, thereby rotating the rotational shaft 104 clockwise so as to screw the bolt 13 into the aperture 12.

The apparatuses 10, 100 may perform the temporary or final tightening operations not only on the hexagon head bolt 13 but other threaded members such as nuts.

INDUSTRIAL APPLICABILITY

The above-described apparatus of the present invention is operable to tighten threaded members into threaded apertures of a crankcase of an engine. The tightening operation can thus be mechanically performed without requiring a human operator's manual work. Such an apparatus is useful in a technique for tightening threaded members, particularly, for attachment of vehicular components.

The invention claimed is:

1. An apparatus for tightening a threaded member to a workpiece, the apparatus shuttling between the workpiece and a supplying section at which the apparatus is supplied with the threaded member, the apparatus comprising:

an automatic robot arm;

a screwing mechanism provided to the automatic robot arm and including a rotational part and a threaded engagement member threadedly engaging the rotational part;

an axial movement means for axially moving to move the threaded engagement member axially of the rotational part to rotate the rotational part;

a shaft member axially movably provided to the rotational part via a slide part slidable relative to the rotational part, the shaft member capable of rotating in unison with the rotational part;

an urging means for urging the shaft member in a direction away from the rotational part;

a socket portion provided to one end of the shaft member for receiving therein the threaded member in such a manner as to transmit the rotation of the shaft member to the threaded member; and a retention means for retaining the threaded member received in the socket portion or retaining the threaded member released from the socket portion.

2. An apparatus according to claim 1, wherein the axial movement means moves axially to rotate the rotational part in either one direction to tighten the threaded member to the workpiece or the opposite direction to loosen the threaded member out of the workpiece.

3. An apparatus for tightening a threaded member, comprising:

a screwing mechanism including a rotational shaft and a threaded engagement member threadedly engaging an outer periphery of the rotational shaft;

an axial movement means provided to one of the rotational shaft and the threaded engagement member for axially moving to rotate the rotational shaft;

a shaft member pivotally connected to the rotational shaft and capable of rotating in unison with the rotational shaft;

a socket portion provided to one end of the shaft member for receiving therein the threaded member in such a manner as to transmit the rotation of the shaft member to the threaded member; and a retention means for retaining the threaded member received in the socket portion or the threaded member released from the socket portion.

4. An apparatus according to claim 3, wherein the shaft member is hollowed to define a space, and the retention means comprises a rod axially movable and disposed within the space of the shaft member and having a lower end positioned in the vicinity of the socket portion, a magnet provided to the lower end of the rod for magnetically holding a head of the threaded member to retain the threaded member received in the socket portion, and a moving means for moving the rod in such a manner as to move the magnet away from the socket portion to retain the threaded member released from the socket portion.

5. An apparatus for tightening a threaded member, comprising:

a screwing mechanism including a rotational shaft and a threaded engagement member threadedly engaging an outer periphery of the rotational shaft;

an automatic robot arm provided to one of the rotational shaft and the threaded engagement member, the automatic robot arm being axially movable to rotate the rotational shaft;

a shaft member provided to the rotational shaft and capable of rotating in unison with the rotational shaft;

a socket portion provided to one end of the shaft member for receiving therein the threaded member in such a manner as to transmit the rotation of the shaft member to the threaded member; and a retention means for retaining the threaded member received in the socket portion or the threaded member released from the socket portion.

6. An apparatus according to claim 5, wherein the shaft member is hollowed to define a space, and the retention means comprises a rod axially movable and disposed within the space of the shaft member and having a lower end positioned in the vicinity of the socket portion, a magnet provided to the lower end of the rod for magnetically holding a head of the threaded member to retain the threaded member received in the socket portion, and a moving means for moving the rod in such a manner as to move the magnet away from the socket portion to retain the threaded member released from the socket portion.

* * * * *